US012562885B2

(12) United States Patent (10) Patent No.: US 12,562,885 B2
Kreimer et al. (45) Date of Patent: Feb. 24, 2026

(54) METHODS AND IP CORES FOR REDUCING VULNERABILITY TO HARDWARE ATTACKS AND/OR IMPROVING PROCESSOR PERFORMANCE

(71) Applicant: FortifyIQ, Inc., Newton, MA (US)

(72) Inventors: Ury Kreimer, Tekoa (IL); Alexander Kesler, Newton, MA (US); Yaacov Belenky, Maale Adumim (IL); Vadim Bugaenko, Nokdim (IL)

(73) Assignee: FORTIFYIQ, INC., Newton, MA (US)

( * ) Notice: Subject to any disclaimer, the term of this patent is extended or adjusted under 35 U.S.C. 154(b) by 201 days.

(21) Appl. No.: 17/760,046

(22) PCT Filed: Feb. 9, 2021

(86) PCT No.: PCT/IL2021/050151
§ 371 (c)(1),
(2) Date: Aug. 3, 2022

(87) PCT Pub. No.: WO2021/161304
PCT Pub. Date: Aug. 19, 2021

(65) Prior Publication Data
US 2023/0077946 A1 Mar. 16, 2023

Related U.S. Application Data

(60) Provisional application No. 63/050,805, filed on Jul. 12, 2020, provisional application No. 62/985,358,
(Continued)

(51) Int. Cl.
*H04L 9/00* (2022.01)
*G06F 21/57* (2013.01)
(Continued)

(52) U.S. Cl.
CPC ............ *H04L 9/004* (2013.01); *G06F 21/577* (2013.01); *G06F 21/72* (2013.01); *H04L 9/3242* (2013.01); *G06F 2221/034* (2013.01)

(58) Field of Classification Search
CPC ..... H04L 9/004; H04L 9/3242; G06F 21/577; G06F 21/72; G06F 2221/034
(Continued)

(56) References Cited

U.S. PATENT DOCUMENTS 8,010,801 B2 * 8/2011 Qi ....................... H04L 63/0485
713/153
9,680,653 B1 * 6/2017 Bradbury .............. H04L 9/0637
(Continued)

FOREIGN PATENT DOCUMENTS

CN 104660466 A 5/2015
CN 107947969 A 4/2018
(Continued)

OTHER PUBLICATIONS

Crenne et al., Configurable memory security in embedded systems, ACM Transactions on Embedded Computing Systems (TECS), vol. 12, No. 3, Art. 71, pp. 1-23 (2013) (Year: 2013).*
(Continued)

*Primary Examiner* — David P Zarka
(74) *Attorney, Agent, or Firm* — Brake Hughes Bellermann LLP

(57) ABSTRACT

In a general aspect, a GHASH semiconductor intellectual property (IP) core can include circuitry for calculating a GHASH function. The IP core can be configured to calculate the GHASH function by calculating the following quantities:
(Continued)

100

$$X_0 = 0;$$

$$X_{i+1} = H^k X_i + \sum_{j=0}^{k-1} \sum_{n=0}^{m-1} C_{ki+j} h_{ijn},$$

where for any i and j; and $$\sum_{n=0}^{m-1} h_{ijn} = H^j, \text{ where } k > 1 \text{ and } m > 1.$$

22 Claims, 15 Drawing Sheets

Related U.S. Application Data filed on Mar. 5, 2020, provisional application No. 62/975,306, filed on Feb. 12, 2020.

(51) Int. Cl.
    *G06F 21/72*           (2013.01)
    *H04L 9/32*            (2006.01)
(58) Field of Classification Search
    USPC ........................................................ 713/189
    See application file for complete search history.

(56)            References Cited

U.S. PATENT DOCUMENTS

| | | | | |
|---|---|---|---|---|
| 2006/0126835 | A1 * | 6/2006 | Kim ...................... | H04L 9/3242 |
| | | | | 380/44 |
| 2017/0026171 | A1 * | 1/2017 | Lal ........................ | H04L 9/0822 |
| 2019/0220721 | A1 * | 7/2019 | Chhabra ............ | G06K 19/0724 |
| 2020/0328879 | A1 * | 10/2020 | Makaram .............. | H04L 1/1812 |
| 2021/0390024 | A1 * | 12/2021 | Durham .................. | G06F 21/79 |
| 2021/0399875 | A1 * | 12/2021 | Inoue ................... | H04L 9/3242 |

FOREIGN PATENT DOCUMENTS

| | | | | | |
|---|---|---|---|---|---|
| EP | 3133576 | B1 * | 11/2019 | ............ | G06F 21/72 |
| EP | 3843327 | A1 * | 6/2021 | ........... | H04L 9/3242 |
| EP | 3559811 | B1 * | 4/2024 | .............. | G06F 11/30 |
| TW | 201911088 | A | 3/2019 | | |
| WO | 2020148771 | A1 | 7/2020 | | |

OTHER PUBLICATIONS

International Search Report for PCT Application No. PCT/IL2021/050151, mailed on Jul. 15, 2021, 4 pages.
International Preliminary Report on Patentability, for PCT/IL2021/050151, dated Jul. 11, 2022, 6 pages.

* cited by examiner

100

Fig. 2                                          $\underline{200}$
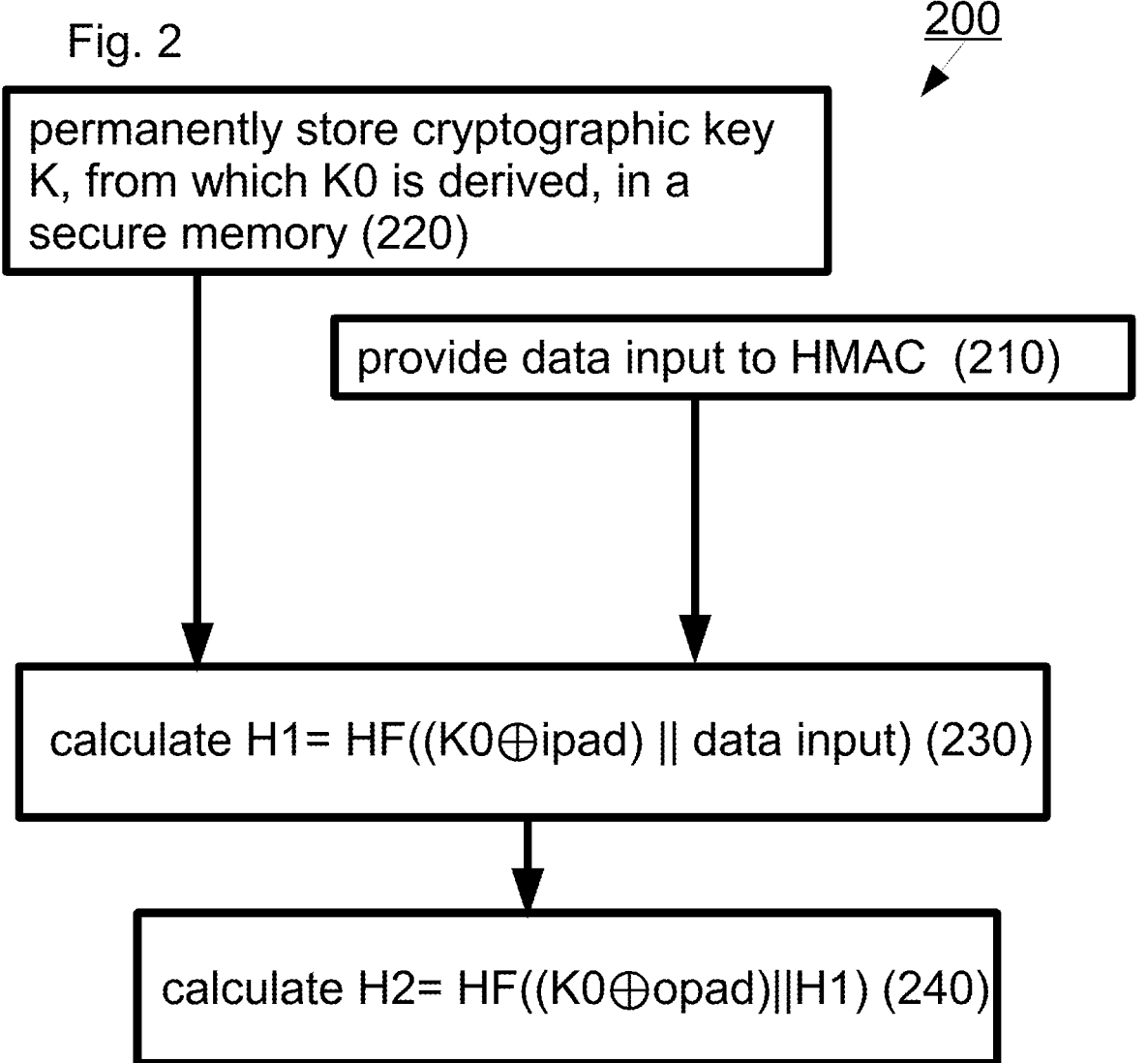
permanently store cryptographic key
K, from which K0 is derived, in a
secure memory (220)
provide data input to HMAC  (210)
calculate H1= HF((K0⊕ipad) || data input) (230)
calculate H2= HF((K0⊕opad)||H1) (240)

Fig. 3                                                        300
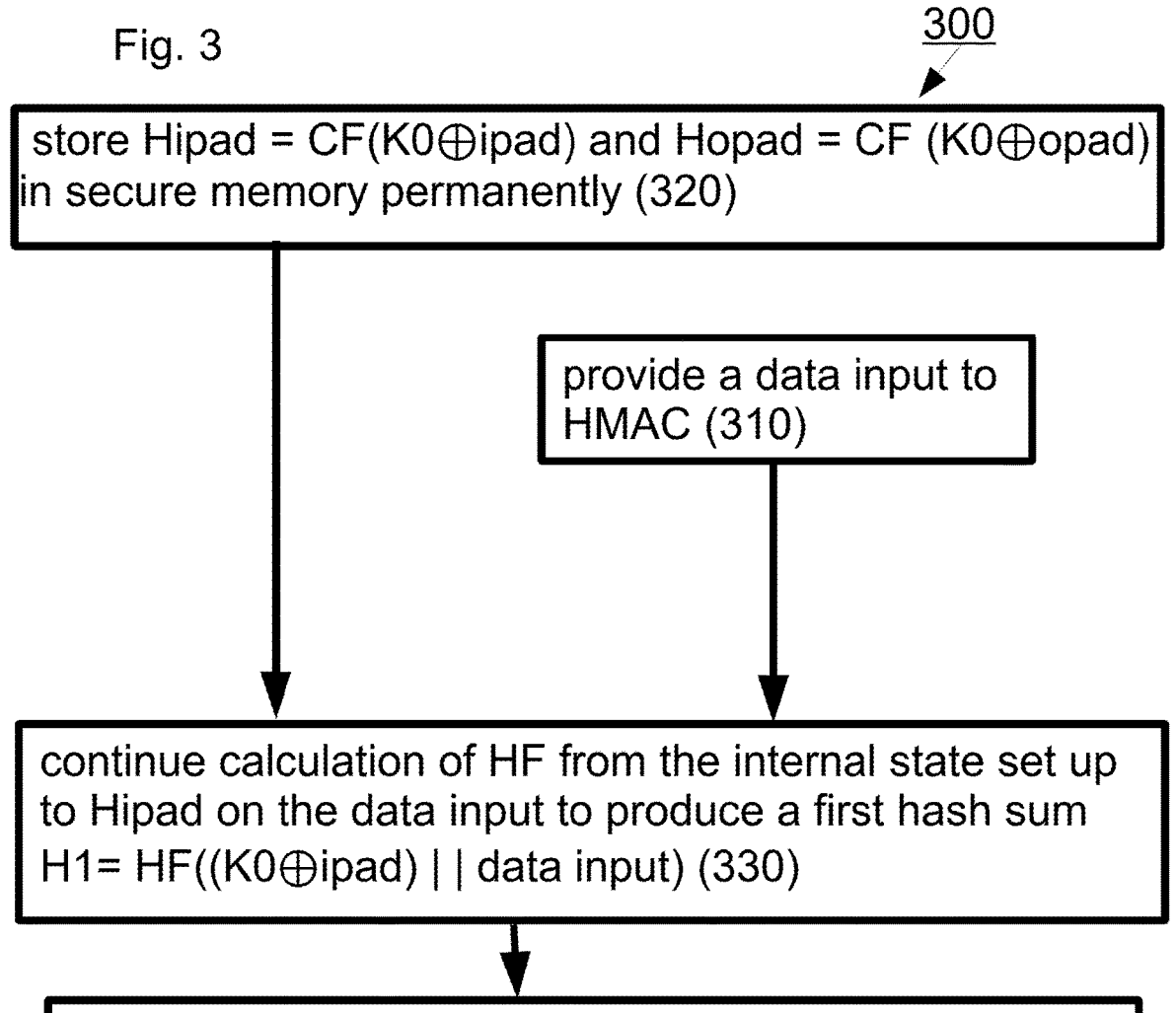
store Hipad = CF(K0⊕ipad) and Hopad = CF (K0⊕opad) in secure memory permanently (320)
provide a data input to HMAC (310)
continue calculation of HF from the internal state set up to Hipad on the data input to produce a first hash sum H1= HF((K0⊕ipad) | | data input) (330)
apply HF with the initial state set up to Hopad on the result of (330) to produce a second hash sum H2= HF((K0⊕opad) || H1) (340)

Figure 4:
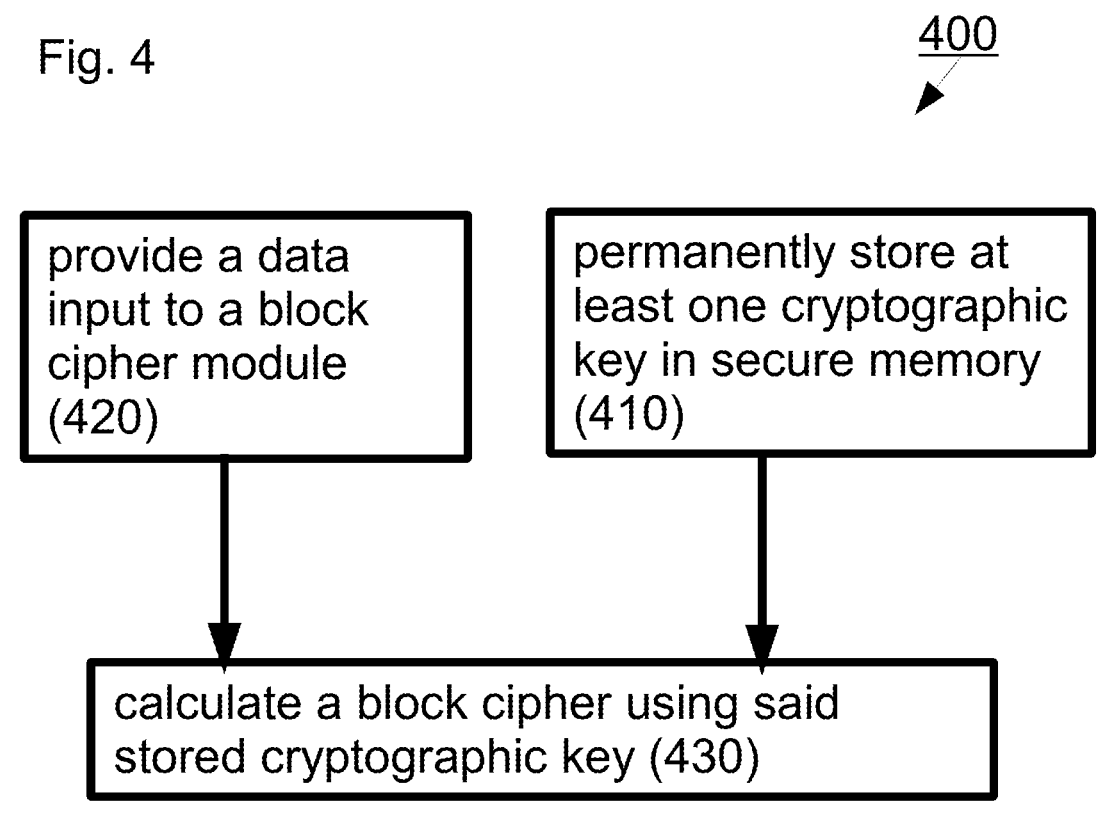

```
┌─────────────────┐        ┌─────────────────────┐
│ provide a data  │        │ permanently store at│
│ input to a block│        │ least one cryptographic│
│ cipher module   │        │ key in secure memory│
│ (420)           │        │ (410)               │
└────────┬────────┘        └──────────┬──────────┘
         │                            │
         ▼                            ▼
┌──────────────────────────────────────────────┐
│ calculate a block cipher using said           │
│ stored cryptographic key (430)                │
└──────────────────────────────────────────────┘
```

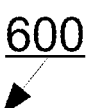

600 simulate circuit functionality in response to multiple inputs where at some inputs fault injection of one or more types is simulated  (610)

collect <input, output> pairs  (620)

record in computer memory for each pair  information regarding fault injection simulation type  (630)

evaluate collected pairs as if they were acquired from a physical circuit  (640)

determine  based upon evaluation whether information about an encryption key was revealed by <input, output> pairs corresponding to simulated fault injection(s)  (650)

compare observed simulated behavior of the circuit against expected behavior  (660)

METHODS AND IP CORES FOR REDUCING VULNERABILITY TO HARDWARE ATTACKS AND/OR IMPROVING PROCESSOR PERFORMANCE

RELATED APPLICATIONS

This application is a national stage entry of International Application No. PCT/IL2021/050151, filed on Feb. 9, 2021, entitled "Methods And IP Cores For Reducing Vulnerability To Hardware Attacks And/Or Improving Processor Performance", which claims priority to and the benefit of:

U.S. provisional application No. 62/975,306 filed on Feb. 12, 2020 and entitled "Practical Template Attack on HMAC based on SHA-2";

U.S. provisional application No. 62/985,358 filed on Mar. 5, 2020 and entitled "Methods and IP Core for Reducing Vulnerability to Side Channel Attacks"; and U.S. provisional application No. 63/050,805 filed on Jul. 12, 2020 and entitled "Methods and IP Core for Reducing Vulnerability to Hardware Attacks and/or improving Processor Performance"; and each of these earlier applications is fully incorporated herein by reference.

FIELD OF THE INVENTION

Some described embodiments are in the field of increasing resistance of computer hardware to attack.

Other described embodiments relate to improving performance of a data processor.

BACKGROUND OF THE INVENTION

Side Channel Attacks (SCA) such as differential power analysis (DPA), simple power analysis (SPA), and fault injection are a common category of cyber-attack used by hackers and intelligence agencies to penetrate sensitive systems in order to perform cryptographic key extraction. New types of side channel attacks are being conceived all the time.

Any device that performs a cryptographic operation should withstand side channel attacks and several security certifications explicitly require such side channel attack resistance tests.

SUMMARY OF THE INVENTION

A broad aspect of the invention relates to improving resistance of hardware to side channel attacks.

One aspect of some embodiments of the invention relates to increasing resistance of HMAC to template attacks by preventing the learning stage. In some exemplary embodiments of the invention, preventing application of hash function(s) to arbitrary data inputs contributes to prevention of the learning stage.

Another aspect of some embodiments of the invention relates to increasing resistance of block ciphers to template attacks by preventing the learning stage. In some exemplary embodiments of the invention, preventing application of a block cipher to arbitrary keys contributes to prevention of the learning stage.

An additional aspect of some embodiments of the invention relates to defense of GCM Authentication (GHASH) Against Side-Channel Attacks. In some embodiments the GCM authentication is High Speed GCM authentication. In some embodiments this aspect is embodied by an IP core. In other exemplary embodiments of the invention, this aspect is embodied by a method.

A further additional aspect of some embodiments of the invention relates to Defense of (e.g. High Speed) GCM Authentication (GHASH) Against Side-Channel Attacks. In some embodiments this aspect is embodied by an IP core. In other exemplary embodiments of the invention, this aspect is embodied by a method.

Yet another aspect of some embodiments of the invention relates to improvement of the exponentiation algorithm in a redundant AES Calculation. In some embodiments this aspect is embodied by one or more methods. This aspect contributes to an improvement of calculation speed in a data processor by shortening the critical path in a hardware implementation of raising to the power of 254 in $GF(2^8)$. In some embodiments this path shortening contributes to an increase in the frequency at which such a design can be used. In some embodiments this aspect is embodied by an IP core. In other exemplary embodiments of the invention, this aspect is embodied by a method.

Still another aspect of some embodiments of the invention relates to limiting the degree of polynomials over a finite field $GF(p)$ during multiplication operations. In some embodiments this aspect is embodied by an IP core. In other exemplary embodiments of the invention, this aspect is embodied by a method.

Another additional aspect of some embodiments of the invention relates to simulating a response to a fault injection attack in a circuit design. In some embodiments this aspect is embodied by an IP core. In other exemplary embodiments of the invention, this aspect is embodied by a method. This aspect relates to evaluation of a chip at the design stage, prior to actual construction of a prototype. Evaluation of a chip at the design stage contributes to an ability to decrease vulnerability to fault injection attacks in the physical chip by implementing design changes prior to production. For purposes of this specification and the accompanying claims the term "fault injection attack" or "fault injection" includes but is not limited to: Differential (DFA); Statistical (SFA), Ineffective (IFA), Statistical Ineffective Fault Attack (SIFA) and Read by Write.

It will be appreciated that the various aspects described above relate to solution of technical problems associated with increasing hardware security.

Alternatively or additionally, it will be appreciated that the various aspects described above relate to solution of technical problems related to frustrating template and/or fault injection attacks.

Alternatively or additionally, it will be appreciated that the various aspects described above relate to solution of technical problems related to improving calculation speed in a data processor.

Alternatively or additionally, it will be appreciated that the various aspects described above relate to solution of technical problems related to improving function of a data processor.

Alternatively or additionally, it will be appreciated that the various aspects described above relate to solution of technical problems related to chip design by implementation of simulated attacks at the design stage.

According to various exemplary embodiments of the invention, two, three, four, five, six or all seven of the aspects recited above are combined. Throughout the application, the various aspects are presented separately in the interest of clarity. In the interest of brevity, the embodiments of the invention which involve combination of two, three, four, five, six or all seven of the aspects recited above are not presented although they comprise an integral part of the invention.

In some exemplary embodiments of the invention there is provided a method for simulating a response to a fault injection attack in a circuit design, the method including: simulating, using a data processor, circuit functionality in response to multiple inputs including simulated fault injection attempts and collecting <input, output>pairs; and recording, in a computer memory, for each of the <input, output>pairs information regarding the simulated fault injection attempt type, wherein "absence of fault injection" is defined as a fault injection attempt type. In some embodiments the method includes evaluating, using a data processor, the collected pairs as if the pairs were acquired from a physical circuit; and determining, based upon the evaluating, whether information about an encryption key was revealed by the <input, output>pairs corresponding to the simulated fault injection attempts. Alternatively or additionally, in some embodiments the method includes comparing, using a data processor, the observed simulated behavior of the circuit against an expected behavior. Alternatively or additionally, the method includes using a probabilistic model for one of more of the following parameters: a set of gates affected by fault injection; a state of affected gates after the fault injection attempt, as a function of their state before the attempt; and the timing at which the fault injection attempt occurs. Alternatively or additionally, in some embodiments a gate is forced to 0 regardless of its state before the fault injection attempt. Alternatively or additionally, in some embodiments a gate is forced to 1 regardless of its state before the fault injection attempt. Alternatively or additionally, in some embodiments a gate is forced to change its state regardless of its state before the fault injection attempt. Alternatively or additionally, in some embodiments states of 2 or more gates are changed.

In some exemplary embodiments of the invention there is provided a method of implementing HMAC in hardware including: (a) permanently storing at least one cryptographic key K, from which K0 is derived, in a secure memory; (b) providing a data input to HMAC; (c) calculating H1=HF ((K0⊕ipad)∥data input); (d) calculating H2=HF ((K0⊕opad)∥ H1); wherein the method increases resistance to template attacks by preventing the learning stage. In some embodiments of the method (K0⊕ipad) and (K0⊕opad) are each derived from a same cryptographic key K. Alternatively or additionally, in some embodiments of the method HF includes a member of the group consisting of SHA-1, SHA-2, SHA-3, SM-3 and MD-5.

In some exemplary embodiments of the invention there is provided a method of implementing HMAC in hardware including: (a) storing Hipad=CF (K0⊕ipad) and Hopad=CF (K0⊕opad) in secure memory permanently, where CF(x) means the internal state of the hash function (HF) after processing of x and K0 is a cryptographic key; (b) providing a data input to HMAC; (c) continuing calculation of HF from the internal state set up to Hipad on the data input to produce a first hash sum H1=HF((K0⊕ipad)∥data input); and (d) applying HF with the initial state set up to Hopad on the result of (c) to produce a second hash sum H2=HF ((K0⊕opad)∥H1). In some embodiments of the method Hipad and Hopad are each derived from a same cryptographic key K. Alternatively or additionally, in some embodiments of the method HF comprises a member of the group consisting of SHA-1, SHA-2, SHA-3, SM-3 and MD-5.

In some exemplary embodiments of the invention there is provided a semiconductor intellectual property (IP) core including: (a) an HMAC module with an interface to external data; (b) at least one internal cryptographic key; and (c) a hash function module dedicated to the HMAC module. In some embodiments the hash function module includes a member of the group consisting of SHA-1, SHA-2, SHA-3, SM-3 and MD-5. Alternatively or additionally, in some embodiments the IP core includes exactly one internal cryptographic key.

In some exemplary embodiments of the invention there is provided a method of implementing a block cipher in hardware including: (a) permanently storing at least one cryptographic key in secure memory; and (b) providing a data input to a block cipher module; and (c) calculating a block cipher using the stored cryptographic key.

In some exemplary embodiments of the invention there is provided an IP core including: (a) a block cipher module with an interface to external data; and (b) at least one internal cryptographic key dedicated to the block cipher module.

In some exemplary embodiments of the invention there is provided a GHASH semiconductor intellectual property (IP) core including: circuitry that calculates the following quantities $$X_0 = 0$$

$$X_{i+1} = H^k X_i + \sum_{j=0}^{k-1}\sum_{n=0}^{m-1} C_{ki+j} h_{ijn}$$

wherein for any i and j $$\sum_{n=0}^{m-1} h_{ijn} = H^j$$

and wherein k>1 and m>1, in order to calculate the GHASH function. In some embodiments addition, multiplication and raising to a power are in a finite field F of a characteristic p. Alternatively or additionally, in some embodiments wherein p=2. Alternatively or additionally, in some embodiments F=GF($2^{128}$). Alternatively or additionally, in some embodiments the elements of F are represented as polynomials over GF(p) modulo a polynomial P irreducible in GF(p). Alternatively or additionally, in some embodiments F=GF ($2^{128}$). Alternatively or additionally, in some embodiments P=$x^{128}$+ $x^7$+$x^2$+x+1. Alternatively or additionally, in some embodiments the values $h_{ijn}$ are randomly and independently generated for every value of i. Alternatively or additionally, in some embodiments the addends of the sum $$\sum_{i=0}^{k-1}\sum_{n=0}^{m-1} C_{ki+j} h_{ijn}$$

are calculated in parallel. Alternatively or additionally, in some embodiments the addends of the sum $$\sum_{i=0}^{k-1}\sum_{n=0}^{m-1} C_{ki+j} h_{ijn}$$

are calculated using a pipeline. Alternatively or additionally, in some embodiments the addends of the sum $$\sum_{i=0}^{k-1}\sum_{n=0}^{m-1}C_{ki+j}h_{ijn}$$

are calculated using several pipelines in parallel.

In some exemplary embodiments of the invention there is provided an AES GCM semiconductor intellectual property (IP) core, the core including: (a) a GHASH core as described above, and (b) an AES block protected against physical attacks in which the attacker discovers a key.

In some exemplary embodiments of the invention there is provided a method including:

using a data processor to calculate the following quantities $$X_0 = 0$$

$$X_{i+1} = H^k X_i + \sum_{j=0}^{k-1}\sum_{n=0}^{m-1}C_{ki+j}h_{ijn}$$

wherein for any i and j $$\sum_{n=0}^{m-1}h_{ijn} = H^j$$

and wherein k>1 and m>1, in order to calculate the GHASH function. In some embodiments addition, multiplication and raising to a power are in a finite field F of a characteristic p. Alternatively or additionally, in some embodiments p=2. Alternatively or additionally, in some embodiments F=GF($2^{128}$). Alternatively or additionally, in some embodiments the elements of F are represented as polynomials over GF(p) modulo a polynomial P irreducible in GF(p). Alternatively or additionally, in some embodiments F=GF ($2^{128}$). Alternatively or additionally, in some embodiments P=$x^{128}$+$x^7$+$x^2$+x+1. Alternatively or additionally, in some embodiments the values $h_{ijn}$ are randomly and independently generated for every value of i. Alternatively or additionally, in some embodiments the addends of the sum $$\sum_{i=0}^{k-1}\sum_{n=0}^{m-1}C_{ki+j}h_{ijn}$$

are calculated in parallel. Alternatively or additionally, in some embodiments the addends of the sum $$\sum_{j=0}^{k-1}\sum_{n=0}^{m-1}C_{ki+j}h_{ijn}$$

are calculated using a pipeline. Alternatively or additionally, in some embodiments the addends of the sum $$\sum_{j=0}^{k-1}\sum_{n=0}^{m-1}C_{ki+j}h_{ijn}$$

are calculated using several pipelines in parallel.

In some exemplary embodiments of the invention there is provided a method including: (a) a method as described above; and (b) calculating an AES GCM block protected against physical attacks in which the attacker discovers a key.

In some exemplary embodiments of the invention there is provided GHASH semiconductor intellectual property (IP) core including: circuitry that calculates the following quantities:

$$X_0 = 0$$

$$X_{i+1} = H^k X_i + \sum_{j=0}^{k-1}C_{ki+j}H^j$$

wherein $X_i$ (for any i) and $C_i$ (for any i) and H are elements of a finite field GF($p^r$) of a characteristic p, redundantly represented as polynomials of a degree less than r+d (d>0) over GF(p), and two such polynomials A and B represent the same element of GF($p^r$) if and only if A-B is divisible by a fixed polynomial P of the degree r irreducible over GF(p). In some embodiments multiplication of redundantly represented elements of F($p^r$) is implemented as polynomial multiplication modulo PQ, wherein Q is a polynomial of the degree d over GF(p). Alternatively or additionally, in some embodiments p=2. Alternatively or additionally, in some embodiments F=GF ($2^{128}$). Alternatively or additionally, in some embodiments P=$x^{128}$+$x^7$+$x^2$+x+1. Alternatively or additionally, in some embodiments Q=$x^7$+x+1.

In some exemplary embodiments of the invention there is provided AES GCM semiconductor intellectual property (IP) core including: (a) a GHASH core as described above and (b) an AES block protected against physical attacks in which the attacker discovers a key.

In some exemplary embodiments of the invention there is provided method including:

using a data processor to calculate the following quantities:

$$X_0 = 0$$

$$X_{i+1} = H^k X_i + \sum_{i=0}^{k-1}C_{ki+j}H^j$$

wherein $X_i$ (for any i) and $C_i$ (for any i) and H are elements of a finite field GF($p^r$) of a characteristic p, redundantly represented as polynomials of a degree less than r+d (d>0) over GF(p), and two such polynomials A and B represent the same element of GF($p^r$) if and only if A-B is divisible by a fixed polynomial P of the degree r irreducible over GF(p). In some embodiments multiplication of redundantly represented elements of F($p^r$) is implemented as polynomial multiplication modulo PQ, wherein Q is a polynomial of the degree d over GF(p). Alternatively or additionally, in some embodiments p=2. Alternatively or additionally, in some embodiments F=GF ($2^{128}$). Alternatively or additionally, in some embodiments P=$x^{128}$+$x^7$+$x^2$+x+1. Alternatively or additionally, in some embodiments Q=$x^7$+x+1.

In some exemplary embodiments of the invention there is provided method including: (a) a method as described above; and (b) calculating an AES GCM block protected against physical attacks in which the attacker discovers a key.

In some exemplary embodiments of the invention there is provided a method of improving performance of a data processor including:

in a field of characteristic 2, computing $X^{254}$ by performing a series of:

(i) multiplications of two different elements of the field; and (ii) raising an element of the field to a power Z, wherein Z is a power of 2 (such operation being a linear transformation); wherein the total number of multiplications is limited to 4, the total number of linear transformations is limited to 4, the number of multiplications executed sequentially is limited to 3 (meaning that some 2 of 4 multiplications can be executed in parallel), and the number of linear transformations executed sequentially is limited to 2. In some embodiments the field is GF ($2^8$).

In some exemplary embodiments of the invention there is provided a method of improving performance of a data processor including:

in a field of characteristic 2, computing $X^{254}$ by performing a series of:

(i) multiplications of two different elements of the field; and (ii) raising an element of the field to a power Z wherein Z is a power of 2 (such operation being a linear transformation); wherein the total number of multiplications is limited to 7, the total number of linear transformations is limited to 6, the number of multiplications executed sequentially is limited to 3, and the number of linear transformations executed sequentially is limited to 1. In some embodiments the field is GF($2^8$).

In some exemplary embodiments of the invention there is provided an intellectual property (IP) core including: circuitry that improves performance of a data processor by:

in a field of characteristic 2, computing $X^{254}$ by performing a series of:

(i) multiplications of two different elements of the field; and (ii) raising an element of the field to a power Z, wherein Z is a power of 2 (such operation being a linear transformation);

wherein the total number of multiplications is limited to 4, the total number of linear transformations is limited to 4, the number of multiplications executed sequentially is limited to 3 (meaning that some 2 of 4 multiplications can be executed in parallel), and the number of linear transformations executed sequentially is limited to 2. In some embodiments the field is GF($2^8$).

In some exemplary embodiments of the invention there is provided an intellectual property (IP) core including: circuitry that improves performance of a data processor by:

in a field of characteristic 2, computing $X^{254}$ by performing a series of:

(i) multiplications of two different elements of the field; and (ii) raising an element of the field to a power Z wherein Z is a power of 2 (such operation being a linear transformation); wherein the total number of multiplications is limited to 7, the total number of linear transformations is limited to 6, the number of multiplications executed sequentially is limited to 3, and the number of linear transformations executed sequentially is limited to 1. In some embodiments the field is GF($2^8$).

In some exemplary embodiments of the invention there is provided a method of limiting the degree of polynomials over a finite field GF(p) during multiplication operations to a degree less than n+d, conducted in a data processor, the method including:

representing the polynomial S=S*mod P∈GF(p)[x]/(P), wherein GF(p)[x] is a ring of polynomials over the finite field GF(p) and (P) is the ideal generated by an irreducible polynomial P of degree n (this field being isomorphic to GF($p^n$)) reducing S*to S**=S*mod PQ which represents the same polynomial=S+mod P∈GF (p)[x]/(P), wherein Q is a polynomial of the degree d over $Z_p$. In some embodiments p=2. Alternatively or additionally, in some embodiments n=8.

In some exemplary embodiments of the invention there is provided a semiconductor intellectual property (IP) core limiting the degree of polynomials over a finite field GF(p) during multiplication operations to a degree less than n+d, the IP core including:

circuitry for representing the polynomial S=S*mod P∈GF (p)[x]/(P), wherein GF(p)[x] is a ring of polynomials over a finite field GF(p) and (P) is the ideal generated by an irreducible polynomial P of degree n (this field being isomorphic to GF($p^n$)) and for reducing S*to S**=S*mod PQ which represents the same polynomial=S*mod P∈GF(p)[x]/(P), wherein Q is a polynomial of the degree d over GF(p). In some embodiments wherein p=2. Alternatively or additionally, in some embodiments n=8.

In some exemplary embodiments of the invention there is provided a method of protecting hardware against fault injection attacks, the method including: (a) dividing a group of bits in a cryptographic hardware component into two or more subsets; (b) adding error detection code (EDC) bits to every subset to produce EDC subsets; (c) reuniting the EDC subsets and re-dividing the bits into two or more subsets, different than the subsets of (b); (d) applying an invertible transformation to every subset from (c) and storing the transformed subsets to a register; (e) loading the content of the register from (d) and applying the inverse transformation (relative to the transformation of (d)); (f) dividing the bits into the same subsets as in (c); (g) verifying correctness of the EDC on the subsets of (f); and (h) raising an error flag if any EDC bit is incorrect. In some embodiments the method includes replacing the final result with a random value in response to an error flag. Alternatively or additionally, in some embodiments the method includes replacing the final result with a constant value in response to an error flag. Alternatively or additionally, in some embodiments EDC is parity. Alternatively or additionally, in some embodiments the transformation is a linear transformation. Alternatively or additionally, in some embodiments the linear transformation is represented by the following matrix over GF(2):

$$\begin{pmatrix} 0 & 1 & 1 & 1 \\ 1 & 0 & 1 & 1 \\ 1 & 1 & 0 & 1 \\ 1 & 1 & 1 & 0 \end{pmatrix}.$$

In some exemplary embodiments of the invention there is provided a semiconductor intellectual property (IP) core for protecting hardware against fault injection attacks, the IP core including circuitry for: (a) dividing a group of bits in a cryptographic hardware component into two or more subsets; (b) adding error detection code (EDC) bits to every subset to produce EDC subsets; (c) reuniting the EDC subsets and re-dividing the bits into two or more subsets, different than the subsets of (b); (d) applying an invertible transformation to every subset from (c) and storing the transformed subsets to a register;

(e) loading the content of the register from (d) and applying the inverse transformation (relative to the transformation of (d)); (f) dividing the bits into the same subsets as in (c); (g) verifying correctness of the EDC on the subsets of (f); and (h) raising an error flag if any EDC bit is incorrect. In some embodiments the IP core replaces the final result with a random value in response to an error flag. Alternatively or additionally, in some embodiments the IP core replaces the final result with a constant value in response to an error flag. Alternatively or additionally, in some embodiments EDC is parity. Alternatively or additionally, in some embodiments the transformation is a linear transformation. Alternatively or additionally, in some embodiments the linear transformation is represented by the following matrix over GF(2):

$$\begin{pmatrix} 0 & 1 & 1 & 1 \\ 1 & 0 & 1 & 1 \\ 1 & 1 & 0 & 1 \\ 1 & 1 & 1 & 0 \end{pmatrix}.$$

In some exemplary embodiments of the invention there is provided a method of reducing a number of sequential operations (critical path) during calculating an arithmetical sum of n addends on a data processor including: (a) iteratively transforming a sum of 3 addends to a sum of 2 addends until only 2 addends remain, so that the number of sequential operations involved in every such transformation of a sum of 3 addends to a sum of 2 addends does not depend on the size of addends in bits; and (b) using a parallel prefix form carry look-ahead adder to calculate a sum of the 2 addends. In some embodiments each addend is represented as an exclusive or (XOR) of k shares. Alternatively or additionally, in some embodiments the parallel prefix form carry look-ahead adder is selected from the group consisting of Kogge-Stone adder (KSA or KS), Brent-Kung adder (BKA), Han-Carlson adder (HCA), and Lynch-Swartzlander spanning tree adder (STA). Alternatively or additionally, in some embodiments the transforming from a sum of 3 addends to 2 addends is performed as at least one set of parallel transformations. Alternatively or additionally, in some embodiments the method includes preserving equal probabilities for all representations of a single addend in the shares during the transforming from a sum of 3 addends to 2 addends.

In some exemplary embodiments of the invention there is provided a method of calculating a hash function including: calculating a hash function using a method as described above. According to various exemplary embodiments of the invention the hash function includes a member of the group consisting of SHA-1, SHA-2 and SM-3.

In some exemplary embodiments of the invention there is provided a semiconductor intellectual property (IP) core including circuitry which reduces a number of sequential operations (critical path) during calculating an arithmetical sum of n addends, including:

(a) a transformation module configured to iteratively transform a sum of 3 addends to a sum of 2 addends until only 2 addends remain, so that the number of sequential operations involved in every such transformation of a sum of 3 addends to a sum of 2 addends does not depend on the size of addends in bits; and (b) an adder which employs a parallel prefix form carry look-ahead algorithm to calculate a sum of the 2 addends. In some embodiments each addend is represented as an exclusive or (XOR) of k shares. Alternatively or additionally, in some embodiments the algorithm is selected from the group consisting of Kogge-Stone adder (KSA or KS), Brent-Kung adder (BKA), Han-Carlson adder (HCA), and Lynch-Swartzlander spanning tree adder (STA). Alternatively or additionally, in some embodiments the transforming from a sum of 3 addends to 2 addends is performed as at least one set of parallel transformations. Alternatively or additionally, in some embodiments the IP core preserves equal probabilities for all representations of a single addend in the shares during the transforming from a sum of 3 addends to 2 addends.

In some exemplary embodiments of the invention there is provided an IP core designed and configured to calculate a hash function including circuitry as described above. According to various exemplary embodiments of the invention the hash function includes a member of the group consisting of SHA-1, SHA-2 and SM-3.

In some exemplary embodiments of the invention there is provided a semiconductor intellectual property core (IP) including circuitry that receives as inputs a positive integer modulus M at least 256 bits long and two non-negative integers A and B and calculates a non-negative integer R such that R mod M=AB mod M where the calculation time depends only on the size of the modulus in bits. In some embodiments the calculating a non-negative integer R uses the following algorithm:

set $R=0$ for every bit $b_i$ of B, from the most significant bit to the least significant bit, perform the following:

set $R=2 \cdot R$ set $R=R+b_i A$ one or more operations of the kind $R=R-q \cdot 2^n M$, where for every such operation n is a fixed non-negative integer and q is set to 0 or 1 each time
return R
wherein all the integers involved in the the calculations are padded if needed by leading zeros to the bit size s+d, wherein s is the modulus size in bits and d is a positive integer constant.

In some embodiments the q is set to 1 if the integer formed by k most significant bits of R are greater than the integer formed by k most significant bits of $2^n M$, and to 0 otherwise, where k is a positive integer constant. Alternatively or additionally, in some embodiments there are exactly two operations of the kind $R=R-q \cdot 2^n M$, wherein for the first the operation n=1 and for the second the operation n=0. Alternatively or additionally, in some embodiments d=2. Alternatively or additionally, in some embodiments k=5. Alternatively or additionally, in some embodiments the input numbers A,B must be less than αM and the output R is guaranteed to be less than $\alpha M$, wherein $\alpha$ is a constant greater than 1. Alternatively or additionally, in some embodiments wherein $\alpha=1.25$. Alternatively or additionally, in some embodiments R is represented by a pair of integers $R_1$, $R_2$, wherein $R=R_1+R_2$ mod $2^{s+d}$. Alternatively or additionally, in some embodiments the additions to and subtractions from R convert the sum of three addends $R_1$, $R_2$, X to a sum of two addends $R_1$, $R_2$ so that $R_1+R_2$ mod $2^{s+d}=R_1+R_2+X$ mod $2^{s+d}$.

In some exemplary embodiments of the invention there is provided a method including:

receiving at a data processor as inputs:

a positive integer modulus M at least 256 bits long; and two non-negative integers A and B; and calculating, by means of the data processor a non-negative integer R;

such that R mod M=AB mod M where the calculation time required by the data processor depends only on the size of the modulus in bits.

In some embodiments the calculating a non-negative integer R uses the following algorithm:

set $R=0$ for every bit $b_i$ of B, from the most significant bit to the least significant bit, perform the following:

set $R=2 \cdot R$ set $R=R+b_i A$ one or more operations of the kind $R=R-q \cdot 2^n M$, where for every such operation n is a fixed non-negative integer and q is set to 0 or 1 each time return R wherein all the integers involved in the the calculations are padded if needed by leading zeros to the bit size s+d, wherein s is the modulus size in bits and d is a positive integer constant. Alternatively or additionally, in some embodiments the q is set to 1 if the integer formed by k most significant bits of R are greater than the integer formed by k most significant bits of $2^n M$, and to 0 otherwise, where k is a positive integer constant. Alternatively or additionally, in some embodiments there are exactly two operations of the kind $R=R-q \cdot 2^n M$, wherein for the first the operation n=1 and for the second the operation n=0. Alternatively or additionally, in some embodiments d=2. Alternatively or additionally, in some embodiments k=6. Alternatively or additionally, in some embodiments the input numbers A,B must be less than $\alpha M$ and the output R is guaranteed to be less than $\alpha M$, wherein $\alpha$ is a constant greater than 1. Alternatively or additionally, in some embodiments $\alpha=1.25$. Alternatively or additionally, in some embodiments R is represented by a pair of integers $R_1$, $R_2$, wherein $R=R_1+R_2$ mod $2^{s+d}$. Alternatively or additionally, in some embodiments the additions to and subtractions from R convert the sum of three addends $R_1$, $R_2$, X to a sum of two addends $R_1'$, $R_2'$ so that $R_1'+R_2'$ mod $2^{s+d}=R_1+R_2+X$ mod $2^{s+d}$. Alternatively or additionally, in some embodiments representation of every bit as XOR of several (e.g. 3) bits contributes to protection against side-channel attacks.

Unless otherwise defined, all technical and scientific terms used herein have the same meaning as commonly understood by one of ordinary skill in the art to which this invention belongs. Although suitable methods and materials are described below, methods and materials similar or equivalent to those described herein can be used in the practice of the present invention. In case of conflict, the patent specification, including definitions, will control. All materials, methods, and examples are illustrative only and are not intended to be limiting.

The term "IP core" as used in this specification and the accompanying claims indicates both prebuilt cells for integration into an existing system-on-chip (SoC) and production specifications for such cells. For purposes of this specification and the accompanying claims, "production specifications" includes but is not limited to, "RTL" files, "gate level netlist" files and "after place and route netlist" files.

For purposes of this specification and the accompanying claims, the term "HMAC" indicates Keyed-hash message authentication code. HMAC is an art accepted standard defined in FIPS PUB 198-1 (July 2008; Information Technology Laboratory National Institute of Standards and Technology Gaithersburg, MD 20899-8900) which is well known to those of skill in the art and fully incorporated herein by reference. While HMAC is a standard protocol, this application deals with changes to the protocol to increase security in the face of attack.

For purposes of this specification and the accompanying claims, the term "SHA" indicates Secure Hash Algorithm as defined in Secure Hash Standard (SHS) in FIPS PUB 180-4 (August 2015; Information Technology Laboratory National Institute of Standards and Technology Gaithersburg, MD 20899-8900) which is well known to those of skill in the art and fully incorporated herein by reference. While SHA is a standard protocol, this application deals with implementation(s) of the protocol to increase security in the face of attack.

For purposes of this specification and the accompanying claims, the term "dedicated" means not shared or used for any other purpose.

For purposes of this specification and the accompanying claims, the term "block cipher" indicates a deterministic algorithm operating on fixed-length groups of bits, called "blocks", with an unvarying transformation that is specified by a symmetric key. In many block ciphers, a block is defined as a fixed number of bits (e.g. 128 bits) and the block is divided into bytes containing a fixed number of bits (e.g. 8 bits). Within a block, the fundamental unit operated upon for encryption (coding) is a byte, e.g. 8 bits. In various block cipher systems, the size of a block and/or a byte varies.

As used herein, the terms "comprising" and "including" or grammatical variants thereof are to be taken as specifying inclusion of the stated features, integers, actions or components without precluding the addition of one or more additional features, integers, actions, components or groups thereof. This term is broader than, and includes the terms "consisting of" and "consisting essentially of" as defined by the Manual of Patent Examination Procedure of the United States Patent and Trademark Office. Thus, any recitation that an embodiment "includes" or "comprises" a feature is a specific statement that sub embodiments "consist essentially of" and/or "consist of" the recited feature.

The phrase "consisting essentially of" or grammatical variants thereof when used herein are to be taken as specifying the stated features, integers, steps or components but do not preclude the addition of one or more additional features, integers, steps, components or groups thereof but only if the additional features, integers, steps, components or groups thereof do not materially alter the basic and novel characteristics of the claimed composition, device or method.

The phrase "adapted to" as used in this specification and the accompanying claims imposes additional structural limitations on a previously recited component.

The term "method" refers to manners, means, techniques and procedures for accomplishing a given task including, but not limited to, those manners, means, techniques and procedures either known to, or readily developed from known manners, means, techniques and procedures by practitioners of architecture and/or computer science.

Implementation of the method and system according to embodiments of the invention involves performing or completing selected tasks or steps manually, automatically, or a combination thereof. Moreover, according to actual instrumentation and equipment of exemplary embodiments of methods, apparatus and systems of the invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

In order to understand the invention and to see how it may be carried out in practice, embodiments will now be described, by way of non-limiting example only, with reference to the accompanying figures. In the figures, identical and similar structures, elements or parts thereof that appear in more than one figure are generally labeled with the same or similar references in the figures in which they appear. Dimensions of components and features shown in the figures are chosen primarily for convenience and clarity of presentation and are not necessarily to scale. The attached figures are:

FIG. 2 is a simplified flow diagram of a method according to some embodiments of the invention; and FIG. 3 is a simplified flow diagram of a method according to some embodiments of the invention;

FIG. 4 is a simplified flow diagram of a method according to some embodiments of the invention;

FIG. 6 is a simplified flow diagram of a method according to some embodiments of the invention.

DETAILED DESCRIPTION OF EMBODIMENTS

Embodiments of the invention relate to methods and IP cores that function to increase resistance of block ciphers and/or HMAC to hardware attack.

Specifically, some embodiments of the invention can be used to protect against side channel attack(s).

The principles and operation of an IP core and/or method according to exemplary embodiments of the invention may be better understood with reference to the drawings and accompanying descriptions.

Before explaining at least one embodiment of the invention in detail, it is to be understood that the invention is not limited in its application to the details set forth in the following description or exemplified by the Examples. The invention is capable of other embodiments or of being practiced or carried out in various ways. Also, it is to be understood that the phraseology and terminology employed herein is for the purpose of description and should not be regarded as limiting.

Exemplary HMAC IP Core

Figure 1:
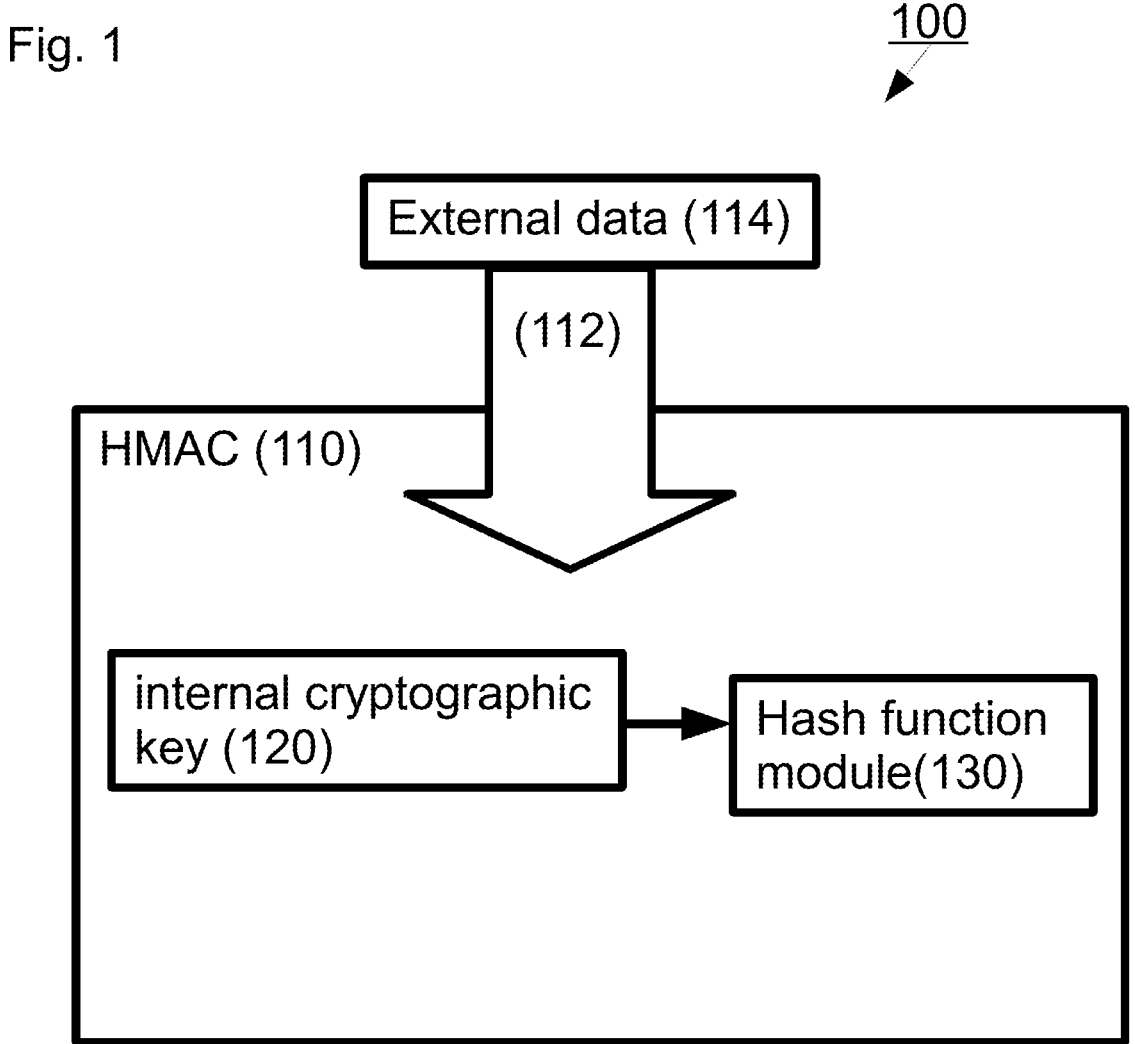
FIG. 1 is a schematic representation of an IP core according to some embodiments of the invention.

FIG. 1 is a schematic representation of an IP core, indicated generally as 100, according to some embodiments of the invention.

In the depicted embodiment, IP core 100 includes HMAC 110 with an interface 112 to external data 114.

Depicted IP core 100 also includes at least one internal cryptographic key 120 and a hash function module 130 dedicated to HMAC. In some embodiments, the hash function module employs SHA-2. In other exemplary embodiments of the invention, the hash function module employs SHA-1 and/or SHA-3 and/or SM-3 and/or MD-5. Alternatively or additionally, in some embodiments the IP core includes exactly one internal cryptographic key.

Exemplary HMAC Implementation Method

FIG. 2 is a simplified flow diagram of a method of implementing HMAC in hardware, indicated generally as 200, according to some embodiments of the invention.

In the depicted embodiment, method 200 includes providing 210 a data input to HMAC. In some embodiments no cryptographic key is provided as an outside input to HMAC. If a cryptographic key is provided as an outside input to HMAC it is not used. The depicted method 200 also includes permanently storing 220 at least one cryptographic key K (from which K0 is derived) in a secure memory, calculating 230 H1=HF((K0⊕ipad)∥ data input) and calculating 240 H2=HF((K0⊕opad)∥ H1).

In some embodiments of method 200, (K0⊕ipad) and (K0⊕opad) are each derived from a same cryptographic key K.

In various exemplary embodiments of the invention, HF includes SHA-1 and/or SHA-2 and/or SHA-3 and/or SM-3 and/or MD-5.

Additional Exemplary HMAC Implementation Method

FIG. 3 is a simplified flow diagram of a method of implementing HMAC in hardware, indicated generally as 300, according to some embodiments of the invention.

Depicted exemplary method 300 includes providing 310 a data input to HMAC. In some embodiments no cryptographic key is provided as an outside input to HMAC. If a cryptographic key is provided as an outside input to HMAC it is not used. Depicted method 300 includes storing 320 Hipad=CF (K0⊕ipad) and Hopad=CF (K0⊕opad) in secure memory permanently. According to these embodiments, CF (x) means the internal state of the hash function (HF) after processing of x and K0 is a cryptographic key.

The depicted method 300 includes continuing 330 calculation of HF from the internal state set up to Hipad on the data input to produce a first hash sum H1=HF((K0⊕ipad)∥ data input) and applying HF 340 with the initial state set up to Hopad on the result of (c) to produce a second hash sum H2=HF((K0⊕opad)∥ H1).

In some embodiments of method 300, Hipad and Hopad are each derived from a same cryptographic key K.

In various exemplary embodiments of the invention, HF includes SHA1 and/or SHA-2 and/or SHA-3 and/or SM-3 and/or MD-5.

Exemplary Block Cipher Implementation Method

FIG. 4 is a simplified flow diagram of a method of implementing a block cipher in hardware, indicated generally as 400, according to some embodiments of the invention.

Depicted exemplary method 400 includes permanently storing 410 at least one cryptographic key in secure memory, providing 420 a data input to a block cipher module and calculating 430 a block cipher using said stored cryptographic key.

Exemplary Block Cipher IP Core

Figure 5:
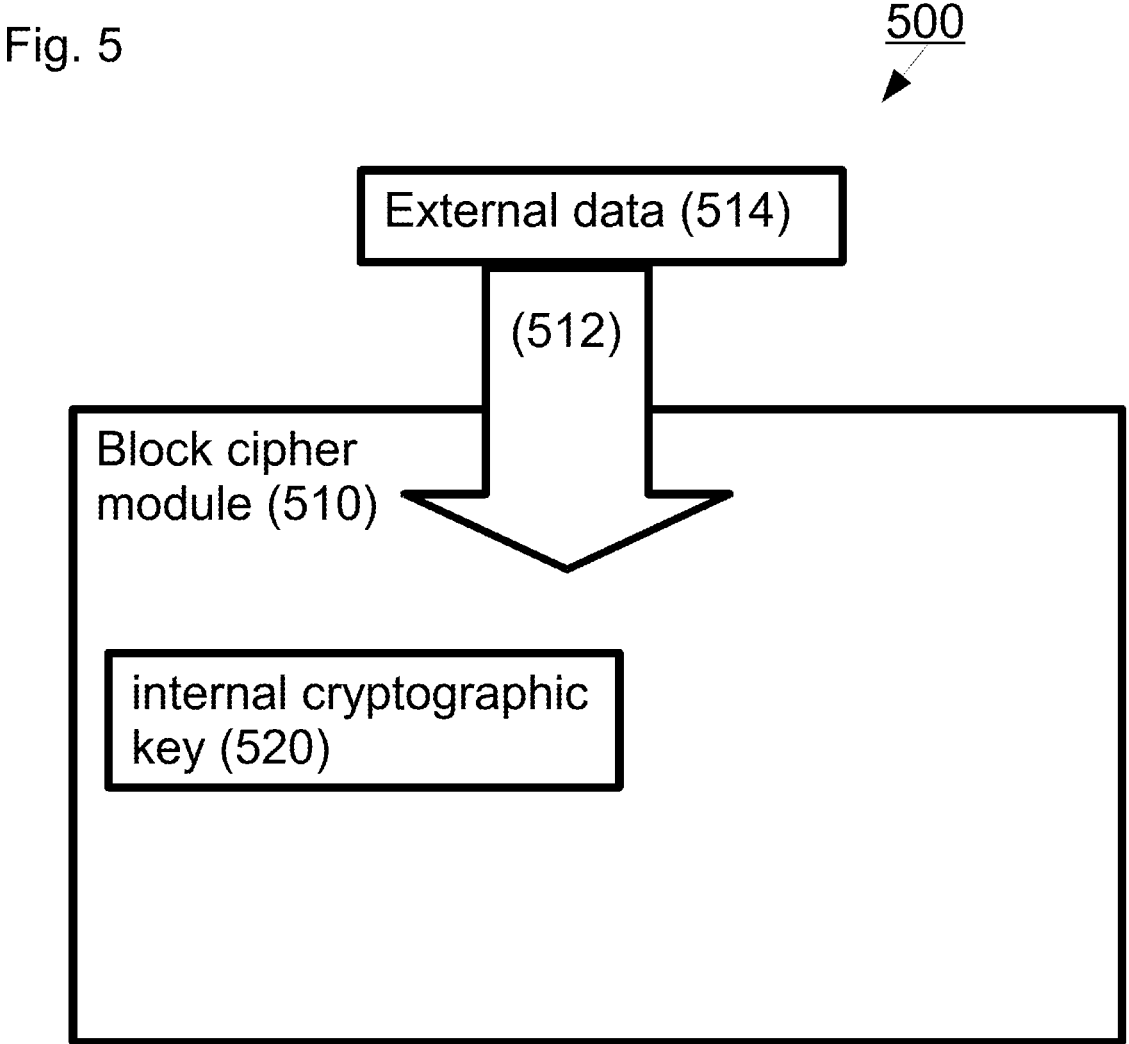
FIG. 5 is a schematic representation of an IP core according to some embodiments of the invention.

FIG. 5 is a schematic representation of an IP core for implementation of a block cipher, indicated generally as 500, according to some embodiments of the invention.

Depicted exemplary IP core 500 includes a block cipher module 510 with an interface 512 to external data 514 and at least one internal cryptographic key 520 dedicated to block cipher module 510.

Exemplary IP Core for Defense of GHASH Against Side-Channel Attacks

Some embodiments of the invention relate to defense of GCM Authentication (GHASH) against side-channel attacks. In some embodiments the GCM authentication is high speed GCM authentication.

In some exemplary embodiments of the invention there is provided a GHASH semiconductor intellectual property (IP) core comprising circuitry that calculates the following quantities $$X_0 = 0$$

$$X_{i+1} = H^k X_i + \sum_{j=0}^{k-1} \sum_{n=0}^{m-1} C_{ki+j} h_{ijn}$$

wherein for any i and j $$\sum_{n=0}^{m-1} h_{ijn} = H^j$$

and wherein k>1 and m>1,
in order to calculate the GHASH function.

In some embodiments addition, multiplication and raising to a power are in a finite field F of a characteristic p. Alternatively or additionally, in some embodiments p=2 and/or F=GF ($2^{128}$). Alternatively or additionally, in some embodiments the elements of F are represented as polynomials over GF(p) modulo a polynomial P irreducible in GF(p). Alternatively or additionally, in some embodiments F=GF ($2^{128}$). Alternatively or additionally, in some embodiments P=$x^{128}$+$x^7$+$x^2$+x+1. Alternatively or additionally, in some embodiments the values $h_{ijn}$ are randomly and independently generated for every value of i. Alternatively or additionally, in various exemplary embodiments the addends of the sum $$\sum_{j=0}^{k-1} \sum_{n=0}^{m-1} C_{ki+j} h_{ijn}$$

are calculated in parallel or using a pipeline or using several pipelines in parallel.

In some exemplary embodiments of the invention, an AES GCM semiconductor intellectual property (IP) core includes a GHASH IP core according as described hereinabove and an AES block protected against physical attacks in which the attacker discovers the key.

Exemplary Method for Defense of GHASH Against Side-Channel Attacks

In some exemplary embodiments of the invention there is provided a method including: using a data processor to calculate the following quantities $$X_0 = 0$$

$$X_{i+1} = H^k X_i + \sum_{j=0}^{k-1} \sum_{n=0}^{m-1} C_{ki+j} h_{ijn}$$

wherein for any i and j $$\sum_{n=0}^{m-1} h_{ijn} = H^j$$

and wherein k>1 and m>1,
in order to calculate the GHASH function.

In some embodiments addition, multiplication and raising to a power are in a finite field F of a characteristic p. Alternatively or additionally, in some embodiments p=2.

Alternatively or additionally, in some embodiments F=GF ($2^{128}$). Alternatively or additionally, in some embodiments the elements of F are represented as polynomials over GF(p) modulo a polynomial P irreducible in GF(p).

In some embodiments F=GF($2^{128}$).

In some embodiments P=$x^{128}$+$x^7$+$x^2$+x+1.

Alternatively or additionally, in some embodiments the values $h_{ijn}$ are randomly and independently generated for every value of i.

Alternatively or additionally, in some embodiments the addends of the sum $$\sum_{j=0}^{k-1} \sum_{n=0}^{m-1} C_{ki+j} h_{ijn}$$

are calculated in parallel.

Alternatively or additionally, in some embodiments the addends of the sum $$\sum_{j=0}^{k-1}\sum_{n=0}^{m-1}C_{ki+j}h_{i_{jn}}$$

are calculated using a pipeline.

Alternatively or additionally, in some embodiments the addends of the sum $$\sum_{j=0}^{k-1}\sum_{n=0}^{m-1}C_{ki+j}h_{i_{jn}}$$

are calculated using several pipelines in parallel.

In some exemplary embodiments of the invention, a method as describe above includes calculating an AES GCM block protected against physical attacks in which the attacker discovers a key.

Additional Exemplary IP Core for Defense of GHASH Against Side-Channel Attacks

Some embodiments of the invention relate to defense of GCM Authentication (GHASH) Against Side-Channel Attacks in an alternative fashion.

In some exemplary embodiments of the invention there is provided a GHASH semiconductor intellectual property (IP) core comprising: circuitry that calculates the following quantities $$X_0 = 0$$

$$X_{i+1} = H^k X_i + \sum_{j=0}^{k-1} C_{ki+j}H^j$$

wherein $X_i$ (for any i) and $C_i$ (for any i) and H are elements of a finite field $GF(p^r)$ of a characteristic p, redundantly represented as polynomials of a degree less than r+d (d>0) over GF(p), and two such polynomials A and B represent the same element of $GF(p^r)$ if and only if A-B is divisible by a fixed polynomial P of the degree r irreducible over GF(p).

In some embodiments multiplication of redundantly represented elements of $GF(p^r)$ is implemented as polynomial multiplication modulo PQ, wherein Q is a polynomial of the degree d over GF(p).

Alternatively or additionally, in some embodiments p=2 and/or $F=GF(2^{128})$.

Alternatively or additionally, in some embodiments $P=x^{128}+x^7+x^2+x+1$.

Alternatively or additionally, in some embodiments $Q=x^7+x+1$.

According to these embodiments, the multiplications are performed modulo PQ, where Q is a fixed polynomial of the degree d.

In some exemplary embodiments of the invention, the IP core described above calculates an AES GCM block protected against physical attacks in which the attacker discovers a key.

Some exemplary embodiments of the invention have, as an advantage, a low number (7) of non-zero terms in the product $PQ=x^{135}+x^{129}+x^{128}+x^{14}+x^9+x^3+1$, and therefore a more lightweight hardware implementation. According to these embodiments, after the calculation modulo PQ is finished, its result is finally reduced modulo P. Optionally it is possible to use a linear transformation L that converts the representation of elements of $GF(2^{128})$ as polynomials modulo P to their representation modulo P', where P' is an irreducible polynomial of the degree 128, add redundancy, perform calculations modulo P'Q, finally reduce the result modulo P', and apply the inverse transformation $L^{-1}$ to return to the representation modulo P.

Additional Exemplary Method for Defense of GHASH Against Side-Channel Attacks

In some exemplary embodiments of the invention there is provided a method including: using a data processor to calculate the following quantities $$X_0 = 0$$

$$X_{i+1} = H^k X_i + \sum_{j=0}^{k-1} C_{ki+j}H^j$$

wherein $X_i$ (for any i) and $C_i$ (for any i) and I are elements of a finite field $GF(p^r)$ of a characteristic p, redundantly represented as polynomials of a degree less than r+d (d>0) over GF(p), and two such polynomials A and B represent the same element of $GF(p^r)$ if and only if A-B is divisible by a fixed polynomial P of the degree r irreducible over GF(p).

In some embodiments, multiplication of redundantly represented elements of $F(p^r)$ is implemented as polynomial multiplication modulo PQ, wherein Q is a polynomial of the degree d over GF(p).

In some exemplary embodiments of the invention, wherein p=2 and/or $F=GF(2^{128})$.

Alternatively or additionally, in some embodiments $P=x^{128}+x^7+x^2+x+1$.

Alternatively or additionally, in some embodiments $Q=x^7+x+1$.

In some exemplary embodiments of the invention, a method as described above includes calculating an AES GCM block protected against physical attacks in which the attacker discovers a key.

Exemplary Method for Improvement of Exponentiation Algorithm in Redundant AES Calculation In some exemplary embodiments of the invention there is provided a method of improving performance of a data processor. In some embodiments the method includes:

in a field of characteristic 2, computing $X^{254}$ by performing a series of:

(i) multiplications of two different elements of the field; and (ii) raising an element of the field to a power Z, wherein Z is a power of 2 (such operation being a linear transformation); wherein the total number of multiplications is limited to 4, the total number of linear transformations is limited to 4, the number of multiplications executed sequentially is limited to 3 (meaning that some 2 of 4 multiplications can be executed in parallel), and the number of linear transformations executed sequentially is limited to 2. In some embodiments the field is $GF(2^8)$ Embodiments of the invention which employ this method shorten the critical path in a hardware implementation of raising to the power of 254 in $GF(2^8)$. In some embodiments this shortening of the critical path contributes to an increase in the frequency at which such a design can be used.

An example of such implementation:

$$x^2 = x^2$$

$$x^3 = x \cdot x^2$$

$$x^{12} = (x^3)^4, x^{48} = (x^3)^{16}, x^{192} = (x^3)^{64}$$

$$x^{14} = x^2 \cdot x^{12}, x^{240} = x^{48} \cdot x^{192}$$

$$x^{254} = x^{14} \cdot x^{240}$$

Additional Exemplary Method for Improvement of Exponentiation Algorithm in Redundant AES Calculation In some exemplary embodiments of the invention there is provided a method of improving performance of a data processor. In some embodiments the method includes: in a field of characteristic 2, computing $X^{254}$ by performing a series of:

(i) multiplications of two different elements of the field; and (ii) raising an element of the field to a power Z wherein Z is a power of 2 (such operation being a linear transformation);

wherein the total number of multiplications is limited to 7, the total number of linear transformations is limited to 6, the number of multiplications executed sequentially is limited to 3, and the number of linear transformations executed sequentially is limited to 1.

In some embodiments the field is GF($2^8$).

Embodiments of the invention which employ this method give a slightly shorter critical path than the method described immediately above, because of 1 rather than 2 linear transformations performed sequentially. However, use of this method increases (relative to the method described immediately above) the gate count (more multiplications and more linear transformations). Embodiments of the invention which employ this method shorten the critical path in a hardware implementation of raising to the power of 254 in GF($2^8$). In some embodiments this shortening of the critical path contributes to an increase in the frequency at which such a design can be used.

An example of such an implementation:

$$x^4 = x^4, x^8 = x^8, x^{16} = x^{16}, x = x^{32}, x^{64} = x^{64}, x^{128} = x^{128}$$

$$x^5 = x \cdot x^4, x^9 = x \cdot x^8, x^{48} = x^{16} \cdot x^{32}, x^{192} = x^{64} \cdot x^{128}$$

$$x^{14} = x^5 \cdot x^9, x^{240} = x^{48} \cdot x^{192}$$

$$x^{254} = x^{14} \cdot x^{240}$$

Exemplary IP Core for Improvement of Exponentiation Algorithm in Redundant AES Calculation In some exemplary embodiments of the invention there is provided an intellectual property (IP) core comprising: circuitry that improves performance of a data processor by:

in a field of characteristic 2, computing $X^{254}$ by performing a series of:

(i) multiplications of two different elements of the field; and (ii) raising an element of the field to a power Z, wherein Z is a power of 2 (such operation being a linear transformation);

wherein the total number of multiplications is limited to 4, the total number of linear transformations is limited to 4, the number of multiplications executed sequentially is limited to 3 (meaning that some 2 of 4 multiplications can be executed in parallel), and the number of linear transformations executed sequentially is limited to 2. In some embodiments the field is GF($2^8$).

Additional Exemplary IP Core for Improvement of Exponentiation Algorithm in Redundant AES Calculation In some exemplary embodiments of the invention there is provided an intellectual property (IP) core comprising: circuitry that improves performance of a data processor by:

in a field of characteristic 2, computing $X^{254}$ by performing a series of:

(i) multiplications of two different elements of the field; and (ii) raising an element of the field to a power Z wherein Z is a power of 2 (such operation being a linear transformation);

wherein the total number of multiplications is limited to 7, the total number of linear transformations is limited to 6, the number of multiplications executed sequentially is limited to 3, and the number of linear transformations executed sequentially is limited to 1. In some embodiments the field is GF($2^8$).

Exemplary Method for General Reduction

In some exemplary embodiments of the invention there is provided a method of limiting the degree of polynomials over a finite field GF(p) during multiplication operations to a degree less than n+d. In some embodiments, conducted in a data processor, the method includes:

representing the polynomial S=S+mod P∈GF(p)[x]/(P), wherein GF(p)[x] is a ring of polynomials over the finite field GF(p) and (P) is the ideal generated by an irreducible polynomial P of degree n (this field being isomorphic to GF($p''$)) and reducing S* to S**=S*mod PQ which represents the same polynomial=S*mod P∈GF(p)[x]/(P), wherein Q is a polynomial of the degree d over GF(p).

In some embodiments p=2 and/or n=8.

Without a method for reducing the degrees of polynomials, with every multiplication the degree would grow. The growing degree would either require an impractically large number of bits to be assigned for every polynomial to accommodate calculation of a specific degree, or would result in overflow producing an incorrect result.

Exemplary IP Core for General Reduction

In some exemplary embodiments of the invention there is provided a semiconductor intellectual property (IP) core which limits the degree of polynomials over a finite field GF(p) during multiplication operations to a degree less than n+d. The IP core includes:

circuitry for representing the polynomial S=S+mod P∈GF(p)[x]/(P), wherein GF(p)[x] is a ring of polynomials over a finite field GF(p) and (P) is the ideal generated by an irreducible polynomial P of degree n (this field being isomorphic to GF($p''$)) and for reducing S* to S**=S*mod PQ which represents the same polynomial=S+mod P∈GF(p)[x]/(P), wherein Q is a polynomial of the degree d over GF(p).

In some embodiments p=2 and/or n=8.

As discussed in detail in the context of the method of the section immediately above, an IP core of this type contributes to a reduction in chip failure. Alternatively or additionally, an IP core of this type provides a reliable and scalable way to implement the method of the section immediately above in a variety of chips.

Exemplary Method for Simulating a Response to a Fault Injection Attack

FIG. 6 is a simplified flow diagram of a method for simulating a response to a fault injection attack in a circuit design indicated generally as 600.

Depicted exemplary method 600 includes simulating 610, using a data processor, circuit functionality in response to multiple inputs, where at some inputs a fault injection attempt of one or more types is simulated. Depicted exemplary method 600 also includes collecting 620<input, output>pairs and recording 630, in a computer memory, for each of the <input, output>pairs information regarding the fault injection attempt type associated with the input. In some embodiments "no fault injection" is defined as a fault injection attempt type. In some embodiments this information is recorded along with the pair.

It is stressed that simulating 610 and recording 630 are not amenable to implementation by a human being.

Simulating 610 involves analyzing a predicted response of a physical attack based upon a design specification for the chip and a general indication of the attack type (e.g. Read by Write) and a specific register location in the design. It is clearly beyond the capacity of the human mind to perform such an analysis because typical circuits contain thousands or even millions of gates.

Recording 630 is beyond the capacity of the human mind to perform because the inability of the human mind to perform such an analysis means there would be no data to record. While it could be argued theoretically that a human mind can do whatever a computer can do, the human mind is infinitely slower than a computer, so simulating/recording a task of this type, would take an unreasonably long time, e.g. thousands of years.

For at least these reasons, method 600 can only be performed by a computerized data processor.

In some embodiments only two fault injection attempt types are defined:

Absence of fault injection attempt; and

Presence of fault injection attempt.

In other exemplary embodiments of the invention, a larger number of fault injection attempt types are defined. According to various exemplary embodiments of the invention 2, 3, 4, 5 or 6 fault injection attempt types are defined.

In some exemplary embodiments of the invention, method 600 includes evaluating 640, using a data processor, the collected pairs from 620 as if the pairs were acquired from a physical circuit and determining 650, based upon the evaluation, whether information about an encryption key was revealed by the <input, output>pairs corresponding to the simulated fault injection.

Evaluation 640 is not practically amenable to implementation by a human being just as similar evaluation performed on data collected from actual physical attacks on a real chip would not amenable to implementation by a human being for at least the reasons set forth above.

In the depicted embodiment, method 600 includes comparing 660, using a data processor, the observed simulated behavior of the circuit against an expected behavior. In some embodiments comparing 660 includes querying a database of expected behaviors (not depicted).

Alternatively or additionally, in some embodiments of method 600 a probabilistic model is used for one of more of the following parameters: the set of the gates affected by fault injection; the state of the affected gates after the simulated fault injection attempt, as a function of their state before the simulated attempt; and the timing at which the simulated fault injection attempt occurs.

In some embodiments of method 600 a gate is forced to 0 regardless of its state before the fault injection attempt. Alternatively or additionally, in some embodiments a gate is forced to 1 regardless of its state before the fault injection attempt. Alternatively or additionally, in some embodiments a gate is forced to change its state regardless of its state before the fault injection attempt. Alternatively or additionally, in some embodiments states of 2 or more gates are changed.

According to various exemplary embodiments of the invention Differential Fault Attacks (DFA) and/or Statistical Fault Attacks (SFA) and/or Ineffective Fault Attacks (IFA) and/or Statistical Ineffective Fault Attack (SIFA) and/or Read by Write Fault Attacks are simulated. In other exemplary embodiments of the invention, additional fault injection attacks, whether currently known or currently unknown, are simulated.

Implementation of method 600 contributes to an increase in hardware security and/or a reduction in chip development time.

Fault Injection Attacks in General

Fault injection attacks (FIA) is a family of attacks on secure hardware engines. In order to mount such an attack, the attacker attempts to deliberately affect the normal functionality using physical means such as a laser beam or a high voltage or a high clock frequency. As a result the attacker occasionally receives corrupted results of error messages instead of correct results.

Analysis of corrupted results, correct results and error messages can reveal the encrypted key used for the calculations.

Existing defenses against fault injection attacks include:

Detection defenses—detection of an attack, and returning an error message instead of the output if an attack has been detected; and Infection defenses—ensuring that in the case of a fault insertion attack an incorrect output is produced.

Conventional chip development includes physical testing of chips after they are manufactured to ascertain how susceptible they are to fault injection attacks. This application proposes adding fault injection simulation options to a functional simulator. Use of fault injection simulation at the design stage allows detection of design flaws prior to chip production.

Differential Fault Injection Attacks

In differential fault injection attacks, the attacker performs the same calculation that involves a secret key twice—with and without fault injection. Comparing the results of these calculations in one or more pairs of calculations, the attacker can eventually find the secret key. Assuming that the fault injection attack changes the intermediate results stored in registers, the following defense appears plausible:

Each time before an intermediate result is stored to a register, apply the following three transformations:

1) Subdivide the intermediate result $X_0$ into several disjoint subsets $M_i$, optionally adding bits with constant values, e.g. zeros, to some of these subsets; the result is called $X_1$.
2) Add error detection code bits to every subset $M_i$; $X_1$ along with the EDC bits is called $X_2$.
3) Subdivide $X_2$ into disjoint subsets $N_i$, and apply an invertible transformation $L_i$ to every $N_i$; the result is called $X_3$.

Then store $X_3$, instead of $X_0$, to the register.

When loading an intermediate result $X_3$ from a register, apply the following transformations:

1) Apply $L_i^{-1}$ to every subset $N_i$ of $X_3$; the result is called $X_2$.

2) Verify and strip all the EDC bits in $X_2$; the result is called $X_1$. If any EDC bit is incorrect, raise an error flag.

3) Verify that the value of all added bits, if any, is as expected, and strip them; the result is called $X_0$. If the value of any added bit is incorrect, raise an error flag.

4) In the case of an error at any round, the final result is replaced with a random value or with zeros or another constant, and an error is reported.

Exemplary Method for Protecting Against Fault Injection Attack

Figure 7:
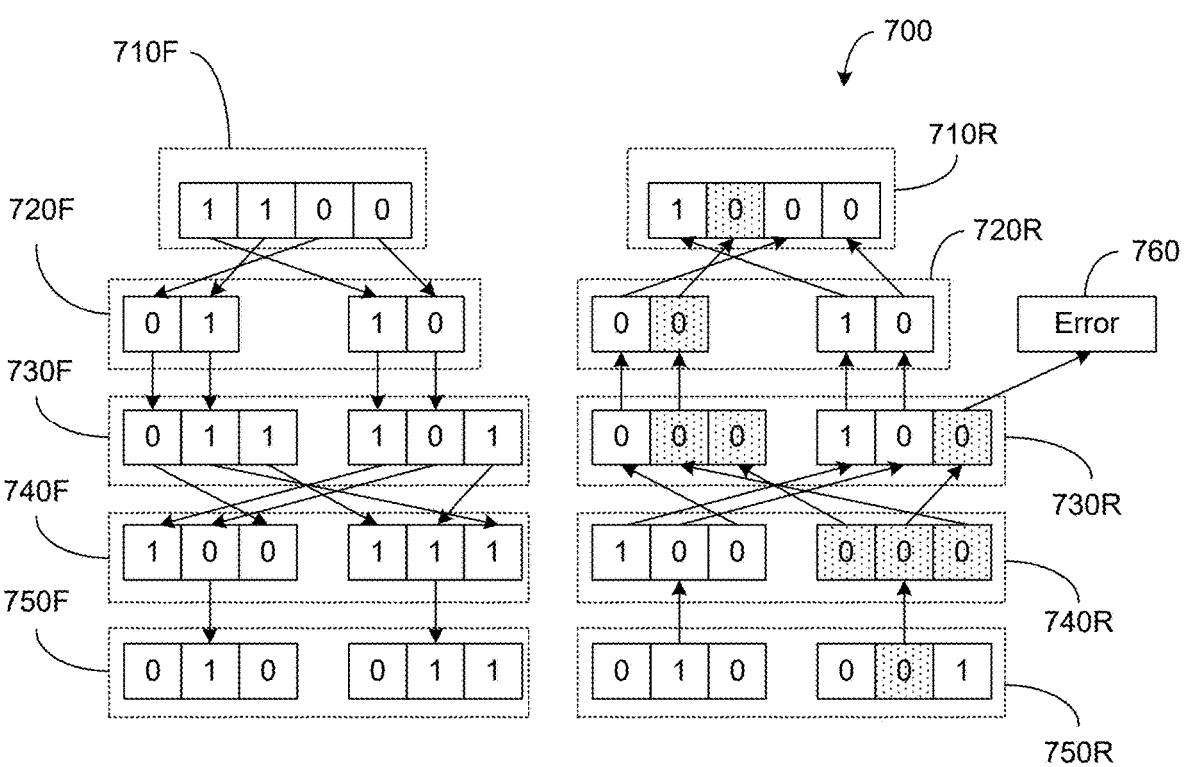
FIG. 7 is a schematic representation of a method according to some embodiments of the invention.

FIG. 7 is a schematic representation of a method of protecting hardware against fault injection attacks, indicated general as 700, according to some embodiments of the invention. In FIG. 7, individual bits of data are represented as squares with either a 0 or a 1 inscribed therein. The bits of data are involved in a calculation being carried out by a computing device.

Briefly, depicted exemplary method 700 has a set of forward steps, culminating with storing a set of bits in a register. These forward steps produce groups of bits which appear on the left side of the figure and have the letter "F" after their reference numeral. Depicted exemplary method 700 also has a set of reverse steps, beginning with loading a set of bits from the register. These reverse steps appear on the right side of the figure and produce groups of bits which have the letter "R" after their reference numeral. Exemplary method 700 is based on the idea that a fault injection attack (e.g. a DFA attack) will change one or more bits stored in the register. Discovery of a single changed bit when the bits are loaded from the register is sufficient to indicate that an attack has occurred and raise an error flag 760. In the figure, changed bits are indicated by gray shading.

Referring now to FIG. 7, exemplary method 700 includes dividing a group of bits 710F in a cryptographic hardware component into two or more subsets 720F. In the depicted embodiment, method 700 includes adding error detection code (EDC) bits to every subset to produce EDC subsets 730F and reuniting the EDC subsets and re-dividing the bits into two or more subsets 740F different than the subsets of 730F. In the depicted example a parity bit is used as the EDC, i.e. the added bits ensure that the number of "1" bits in every subset in 730F is even.

At this stage method 700 applies an invertible transformation to every subset from at 740F and stores the transformed subsets 750F to a register.

Transformed subsets 750F reside in the register until they are loaded from the register. Loading begins the reverse portion of method 700.

In the depicted embodiment, loading the content of the register where subsets 750F were stored produces subsets 750R. Note that one bit in 750R is shaded gray, indicated that an attack on the register occurred between storing to the register and loading from the register. However, the attack is not yet discovered.

In the depicted embodiment, method 700 applies the inverse transformation (relative to the transformation that produced 750F) to produce subsets 740R. At this stage, 3 bits in 740R are different than corresponding bits in 740 F as indicated by gray shading.

In the depicted embodiment, method 700 divides the bits into the same subsets as in 730F to produce subsets 730R. This permits verification of correctness of the EDC bits by recalculating the EDC bits and comparing them to the actual EDC bits. In the depicted example the number of the "1" bits in the right subset of 730R is odd, so an error flag 760 is raised.

According to various exemplary embodiments of the invention method 700 responds to an error flag 760 in different ways. In the depicted embodiment, method 700 replaces the final result with a random value in response to an error flag. Alternatively or additionally, in some embodiments method 700 replaces the final result with a constant value in response to an error flag. For example, in some embodiments the constant value is zero. In either case, a constant or random value provides no information to an attacker. Alternatively or additionally, in various exemplary embodiments method 700 halts execution immediately in response to an error flag 760 or finishes execution (i.e. continues to 720R and 710R) despite error flag 760 then gives a random or constant value.

In some exemplary embodiments of method 700, EDC is parity. Alternatively or additionally, in some embodiments the transformation is linear. In some embodiments the linear transformation is represented by the following matrix over GF(2):

$$\begin{pmatrix} 0 & 1 & 1 & 1 \\ 1 & 0 & 1 & 1 \\ 1 & 1 & 0 & 1 \\ 1 & 1 & 1 & 0 \end{pmatrix}.$$

Exemplary IP Core for Protecting Against Fault Injection Attack

In some exemplary embodiments of the invention there is provided a semiconductor intellectual property (IP) core for protecting hardware against fault injection attacks, The IP core includes circuitry for:

(a) dividing a group of bits in a cryptographic hardware component into two or more subsets;

(b) adding error detection code (EDC) bits to every subset to produce EDC subsets;

(c) reuniting the EDC subsets and re-dividing the bits into two or more subsets, different than the subsets of (b);

(d) applying an invertible transformation to every subset from (c) and storing the transformed subsets to a register;

(e) loading the content of the register from (d) and applying the inverse transformation (relative to the transformation of (d));

(f) dividing the bits into the same subsets as in (c);

(g) verifying correctness of the EDC on the subsets of (f); and (h) raising an error flag if any EDC bit is incorrect.

In some embodiments the IP core includes circuitry for replacing the final result with a random value in response to an error flag and/or circuitry for replacing the final result with a constant value in response to an error flag. Alternatively or additionally, in some embodiments EDC is parity. Alternatively or additionally, in some embodiments the transformation is a linear transformation.

In some embodiments the linear transformation is represented by the following matrix over GF(2):

$$\begin{pmatrix} 0 & 1 & 1 & 1 \\ 1 & 0 & 1 & 1 \\ 1 & 1 & 0 & 1 \\ 1 & 1 & 1 & 0 \end{pmatrix}.$$

Exemplary SHA Gadgets and Circuits

Bits, Random Bits and Gadgets

For purposes of this specification and the accompanying claims, the term the elements of F=GF(2) (0 and 1) are referred to as "bits". For purposes of this specification and the accompanying claims, variables with bit values are referred to as "bit variables".

For purposes of this specification and the accompanying claims, a discrete random bit variable is referred to as a "random bit".

For purposes of this specification and the accompanying claims, elements of vector spaces over F are referred to as "binary vectors". According to various exemplary embodiments of the invention a binary vector $B \in F^k$ is considered as a tuple of k coordinates bits: $B=(b^1, b^2, \ldots, b^k)$.

For purposes of this specification and the accompanying claims, a function with k input random bits and l output random bits is considered as mapping m: $F^k \rightarrow F^l$ and is called a "gadget". If l=1 then the gadget is called a "prime gadget". Otherwise it is called a "composite gadget". As usual in art accepted language, input variables are referred to as arguments and output variables are referred to as values of the function.

Any composite gadget with l outputs is considered as a set of l prime gadgets.

Exemplary SHA Gadgets

Exemplary Prime Gadgets $$AND2(a,b)=ab$$

$$XOR2(a,b)=a+b$$

$$XOR3(a,b,c)=a+b+c$$

$$Maj(a,b,c)=ab+ac+bc$$

$$Ch(a,b,c)=a(b+c)+c$$

$$Lin(a,b,c)=ab+c$$

Exemplary Composite Gadgets $$Compose(p,g,p^*,g^*)=AND2(p,p^*),Lin(g,p^*,g^*)$$

$$AND2XOR2(a,b)=AND2(a,b),XOR2(a,b)$$

$$MajXOR3(a,b,c)=Maj(a,b,c),XOR3(a,b,c)$$

Exemplary Multigadgets

Arguments of multigadgets are 32-bit variables. The expression $x_i$ denotes the i-th bit of the variable x. Index i ranges from 0 to 31.

$$\Sigma_0(x)=XOR3(x_{i-2(mod32)},x_{i-13(mod32)},x_{i-22(mod32)})$$

$$\Sigma_1(x)=XOR3(x_{i-6(mod32)},x_{i-11(mod32)},x_{i-25(mod32)})$$

$$MultiXOR3(x,y,z)=XOR3(x_i,y_i,z_i)$$

$$MultiMaj(x,y,z)=Maj(x_i,y_i,z_i)$$

$$MultiCh(x,y,z)=Ch(x_i,y_i,z_i)$$

$$MultiMajShifted(x,y,z)=0 \text{ if } i=0; Maj(x_{i-1},y_{i-1},z_{i-1}) \text{ otherwise}$$

$$MultiANDShifted(x,y)=0 \text{ if } i=0; AND2(x_{i-1},y_{i-1}) \text{ otherwise}$$

$$ThreeToTwo(x,y,z)=(MultiXOR3(x,y,z),MultiMajShifted(x,y,z))$$

$$TwoToTwo(x,y)=(MultiXOR2(x,y),MultiANDShifted(x,y))$$

$$KSround(p_i,g_i)=(p_i,g_i) \text{ if } [i/m]=0(mod\ 2);$$

$$(AND2(p_i,P_j),Lin(g_i,p_j,g_j)) \text{ otherwise}$$

(where $m=2^{r-1}$, $j=\lfloor[i/m]*m\rfloor-1$, $\lfloor x \rfloor$ means integral part of x)

Exemplary Relationships Among Gadgets

For purposes of this specification and the accompanying claims, a set S of gadgets is considered "related" if the gadgets share common variables (arguments and/or values). For purposes of this specification and the accompanying claims a gadget B is said to follow gadget A if some argument of B is a value of A.

For purposes of this specification and the accompanying claims, a gadget B "directly depends" on a gadget A if there exists a variable that is an input for B and an output of A.

For purposes of this specification and the accompanying claims, a gadget B "depends" on a gadget A if there exists a finite sequence of gadgets which starts with A and ends with B and each gadget in the said sequence, except for the first one, directly depends on the previous one.

For purposes of this specification and the accompanying claims, a set S of gadgets is a "circuit" if the following conditions hold:

1) Each variable is a value in not more than one gadget among the gadgets in S; and 2) There are no two gadgets A and B among the gadgets in S which are mutually dependent on one another.

For purposes of this specification and the accompanying claims, variables which are not values of any gadget among the S gadgets are called "initial variables".

For purposes of this specification and the accompanying claims, variables which are not arguments of any gadget among the S gadgets are called "ultimate variables".

For purposes of this specification and the accompanying claims, variables which are neither "initial variables" nor "ultimate variables" are caled "intermediate variables".

Exemplary Kogge-Stone Circuitry

FIG. 8A, FIG. 8B, FIG. 8C, FIG. 8D and FIG. 8E illustrate steps performed by exemplary Kogge-Stone circuitry using an 8 bit word as an example.

The Kogge-Stone algoritm calculates the sum of n-digital binary numbers in time O(log n). For simplicity, it is assumed that the number of digits is degree of two ($n=2^k$). Input of the algorithm is a pair of n-bit variables (802 and 804 in FIG. 8A) $a=\{a_i: i=0, 1, 2, \ldots, n-1\}$ and $b=\{b_i:i=0,1, 2, \ldots, n-1\}$. And the output is its sum—n-bit variable $s=\{s_i: i=0, 1, 2, \ldots, n-1\}$.

Figure 8A:
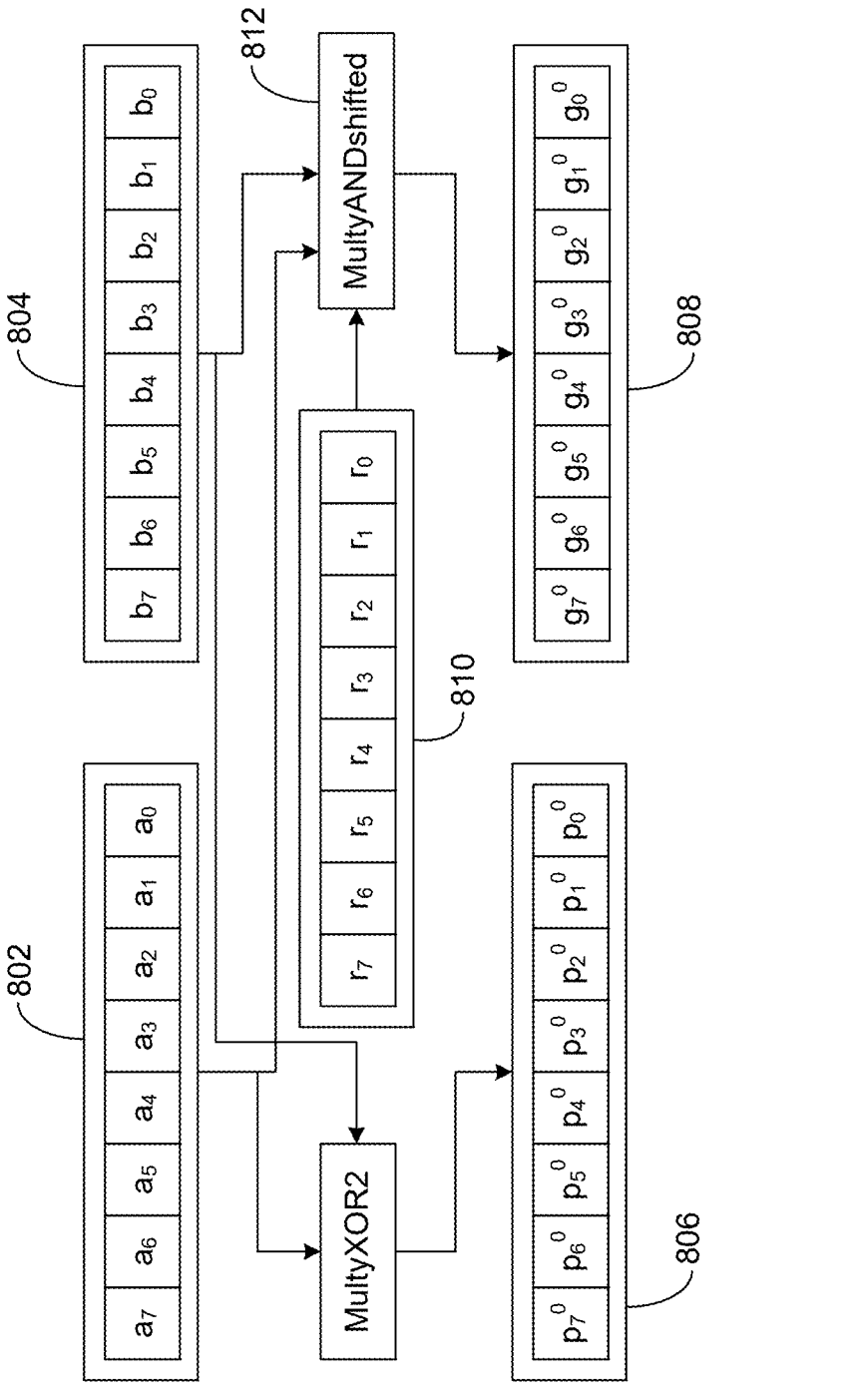
FIG. 8A is a schematic representation of a portion of a method executed by circuitry according to some embodiments of the invention.
Figure 8B:
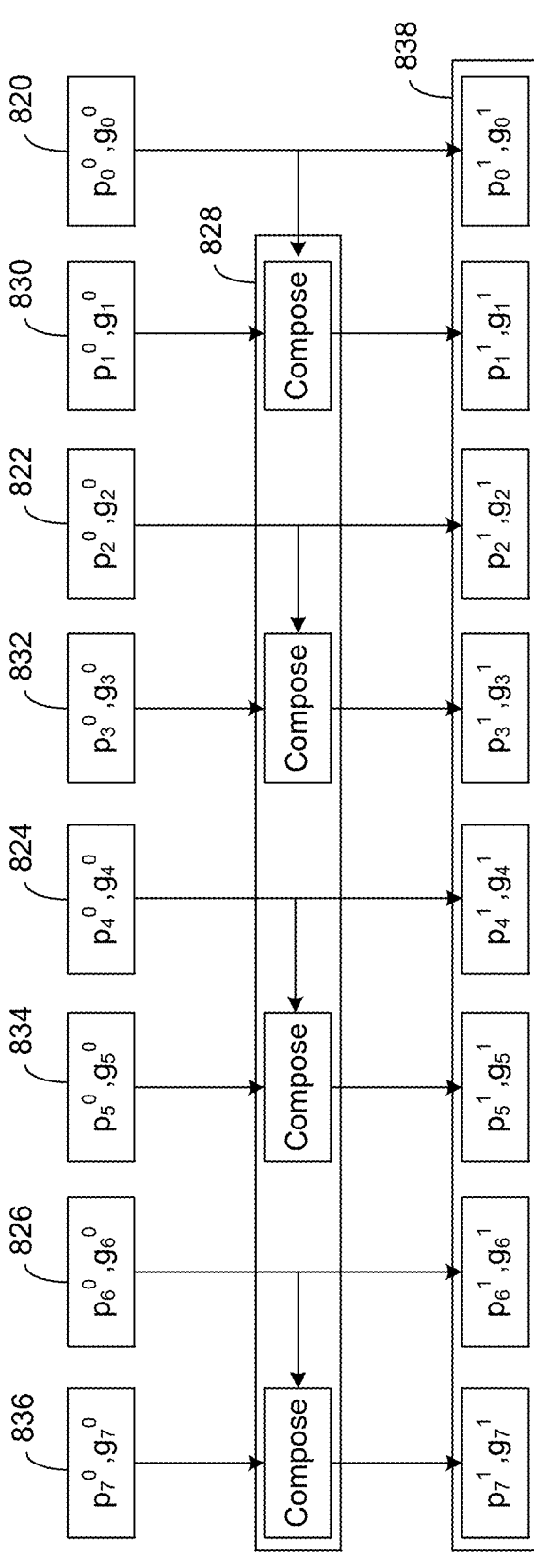
FIG. 8B is a schematic representation of a portion of a method executed by circuitry according to some embodiments of the invention.
Figure 8C:
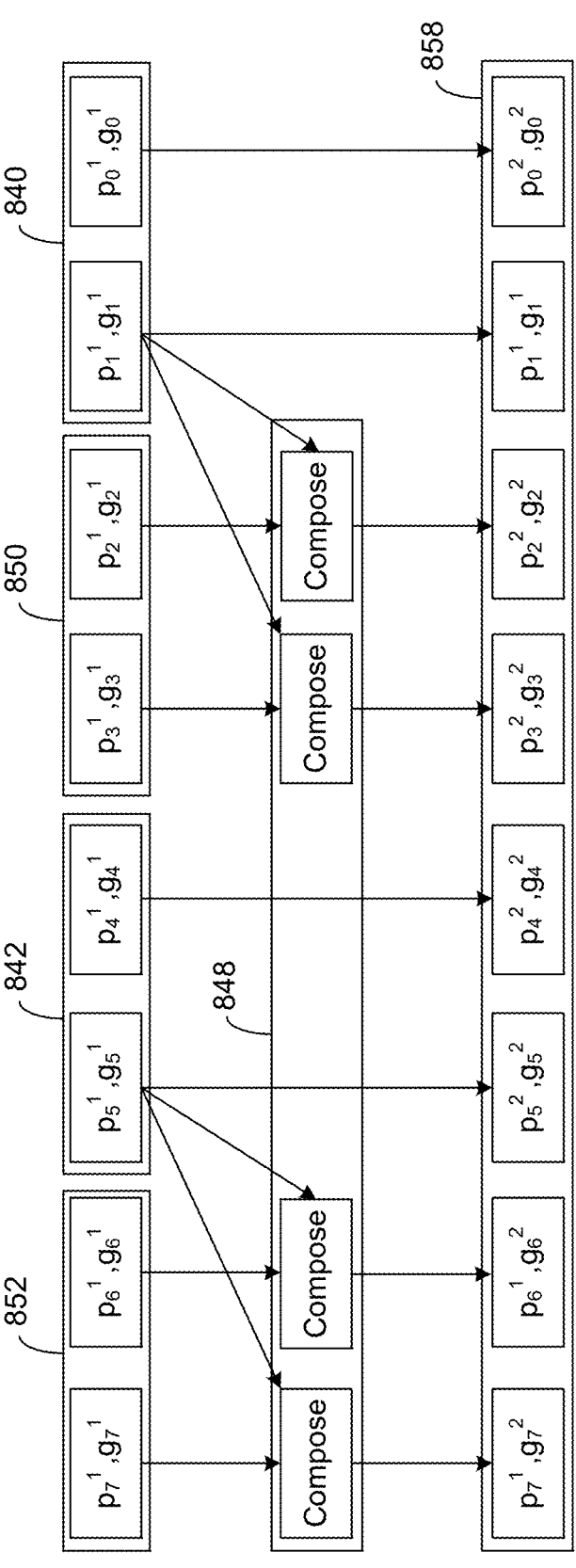
FIG. 8C is a schematic representation of a portion of a method executed by circuitry according to some embodiments of the invention.
Figure 8D:
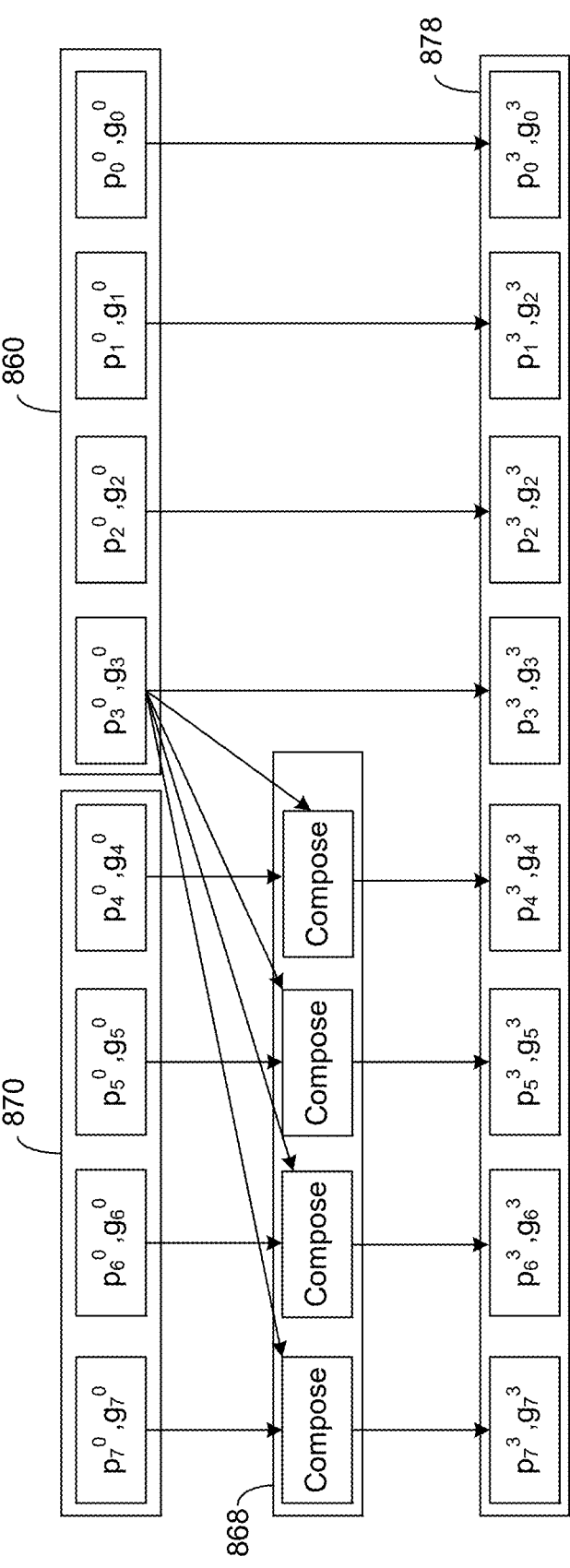
FIG. 8D is a schematic representation of a portion of a method executed by circuitry according to some embodiments of the invention.
Figure 8E:
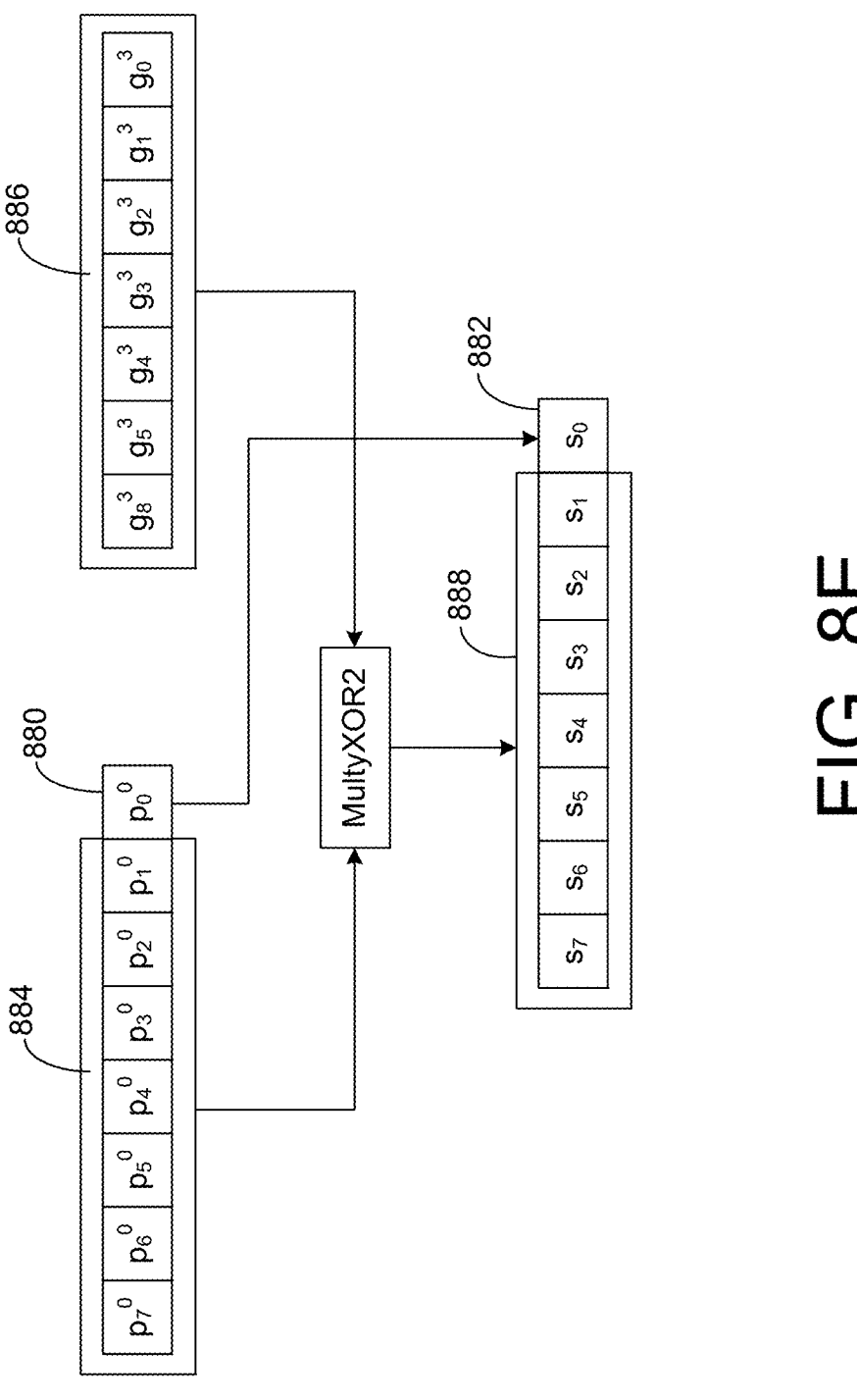
FIG. 8E is a schematic representation of a portion of a method executed by circuitry according to some embodiments of the invention.

The Kogge-Stone algorithm consists of the following steps: precalculation (FIG. 8A), k main steps (FIG. 8b, FIG. 8C and FIG. 8D) and postcalculation (FIG. 8E).

The input of the precalculation are input variables a (802) and b (804) and the output are variables $p^0$ and $g^0$ (806 and 808 respectively) which are bitwise XOR and AND of the summands a and b, respectively as depicted. The additional input 810 is not used.

In the Kogge-Stone algoritm, main algorithm step number s consists in calculation of values of variables $p^{s+1}$ and $g^{s+1}$ (838 at FIG. 8B; 858 at FIG. 8C; 878 at FIG. 8D) from $p^s$ and $g^s$ (820, 822, 824, 826, 830, 832, 834, 836 at FIG. 8B; 840, 842, 850, 852 at FIG. 8C; 860, 870 at FIG. 8D).

Algorithm steps are enumerated from 0 to k−1.

Step s begins with dividing bits of both inputs to groups having $2^s$ bits each and numbering the groups beginning from zero. The bits $p_i^s$ and $g_i^s$ that pertain to groups with even group indexes (i.e. those bits which have zero in s-th digit of their bit index i) (820, 822, 824, 826 at FIG. 8B; 840, 842 at FIG. 8C; 860 at FIG. 8D) are copied to the bits of $p_i^{s+1}$ and $g_i^{s+1}$, respectively. For the bits $p_i^s$ and $g_i^s$ that pertain to groups groups with odd numbers (i.e. those bits which have one in s-th digit of their bit index i) (830, 832, 834, 836 at FIG. 8B; 850, 852 at FIG. 8C; 870 at FIG. 8D), the corresponding bits $p_i^{s+1}$ and $g_i^{s+1}$ bits are calculated by the following rule (depicted as Compose-828 at FIG. 8B, 848 at FIG. 8C, 868 at FIG. 8D): $p_i^{s+1} = \text{AND2}\,(p_i^s, p_j^s)$ $$g_i^{s+1} = Lin(g_i^s, p_j^s, g_j^s)$$

or equivalently, replacing two prime gadgets AND2, Lin with a composite gadget Compose, $$p_i^{s+1}, g_i^{s+1} = \text{Compose}(p_i^s, g_i^s, p_i^s, g_j^s)$$

where $j = \lfloor i/m \rfloor * m - 1$.

After the $(k-1)^{th}$ main step, the postcalculation step is performed by the following rule:

$$s_0 = p_0^0$$

$$s_i = \text{XOR2}(p_i^0, g_{i-1}^k)\text{for } i > 0$$

See FIG. 8E, where $p_0^0$ is depicted as 880, $s_0$ as 882, $p_1^0 \ldots p_7^0$ as 884, $g_0^k \ldots g_6^k$ as 886, and $s_1 \ldots s_7$ as 888.

The described circuit realizes addition of two 32-bit integers using Kogge-Stone algorithm. The initial variables of the circuit are two 32-bit integers—terms A and B. The ultimate variable is 32-bit integer—the sum S.

Exemplary SHA256 Round Circuitry

Figure 9:
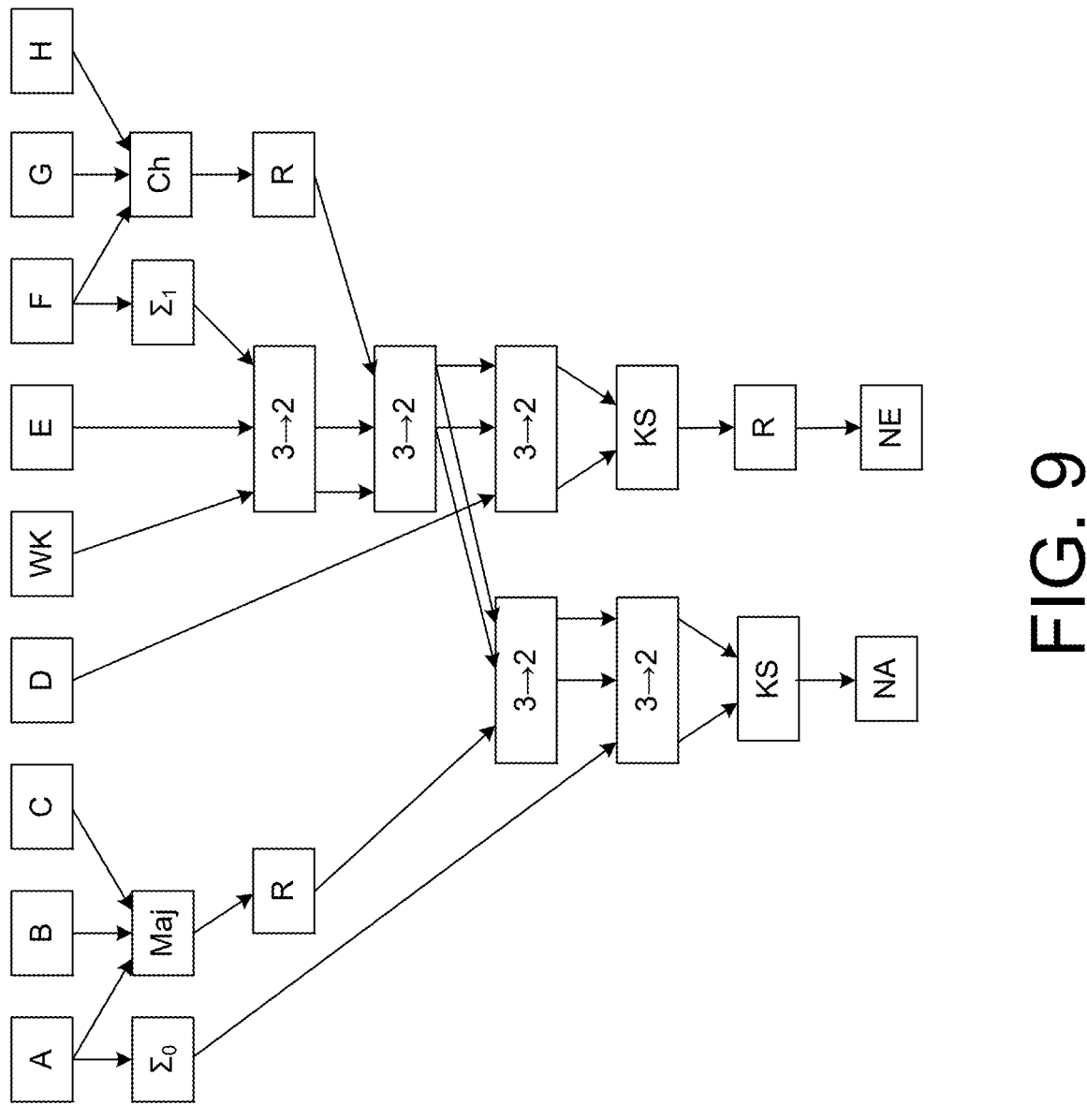
FIG. 9 is a schematic representation of a method executed by circuitry according to some embodiments of the invention.

A circuit which realizes one round of SHA-256 is presented in FIG. 9.

The initial variables of the circuit are a 32-bit word WK (which represents a sum modulo $2^{32}$ of a 32-bit word of SHA256 expanded input and a SHA256 32-bit round constant) and 8 32-bit words A, B, C, D, E, F, G, H of a SHA256 internal state.

The ultimate variables are 32-bit words NA and NE.

Blocks marked "3→2" stand for theThreeToTwo gadget, blocks marked "KS" stand for the Kogg-Stone addition circuitry, and blocks marked "R" pass the data through.

The circuitry of one round is typically run in a loop 64 times, where the input WK at every loop comes from a data expansion unit, the input values A, B, C, D, E, F, G, H come from a register, and some of the input values aling with the output values NA and NE, to be used as the input at the next iteration.

Figure 10:
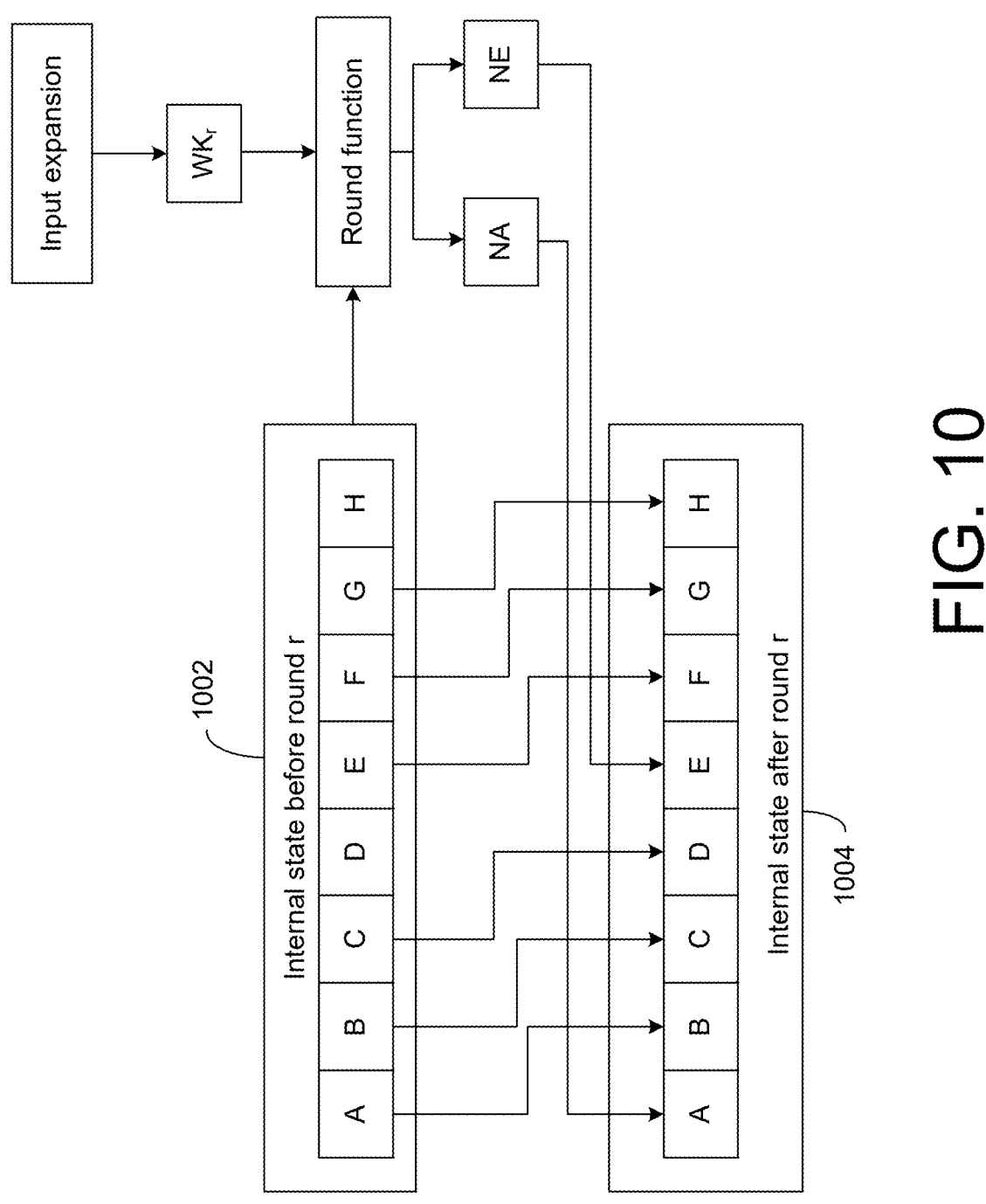
FIG. 10 is a schematic representation of a method executed by circuitry according to some embodiments of the invention.

FIG. 10 depicts how the values in said register are typically changed after one iteration of the loop. 1002 represents the state of the register before a loop iteration, and 1004 represents the state of the same register after the iteration.

Exemplary SHA256 Compression Function Circuitry

Figure 11:
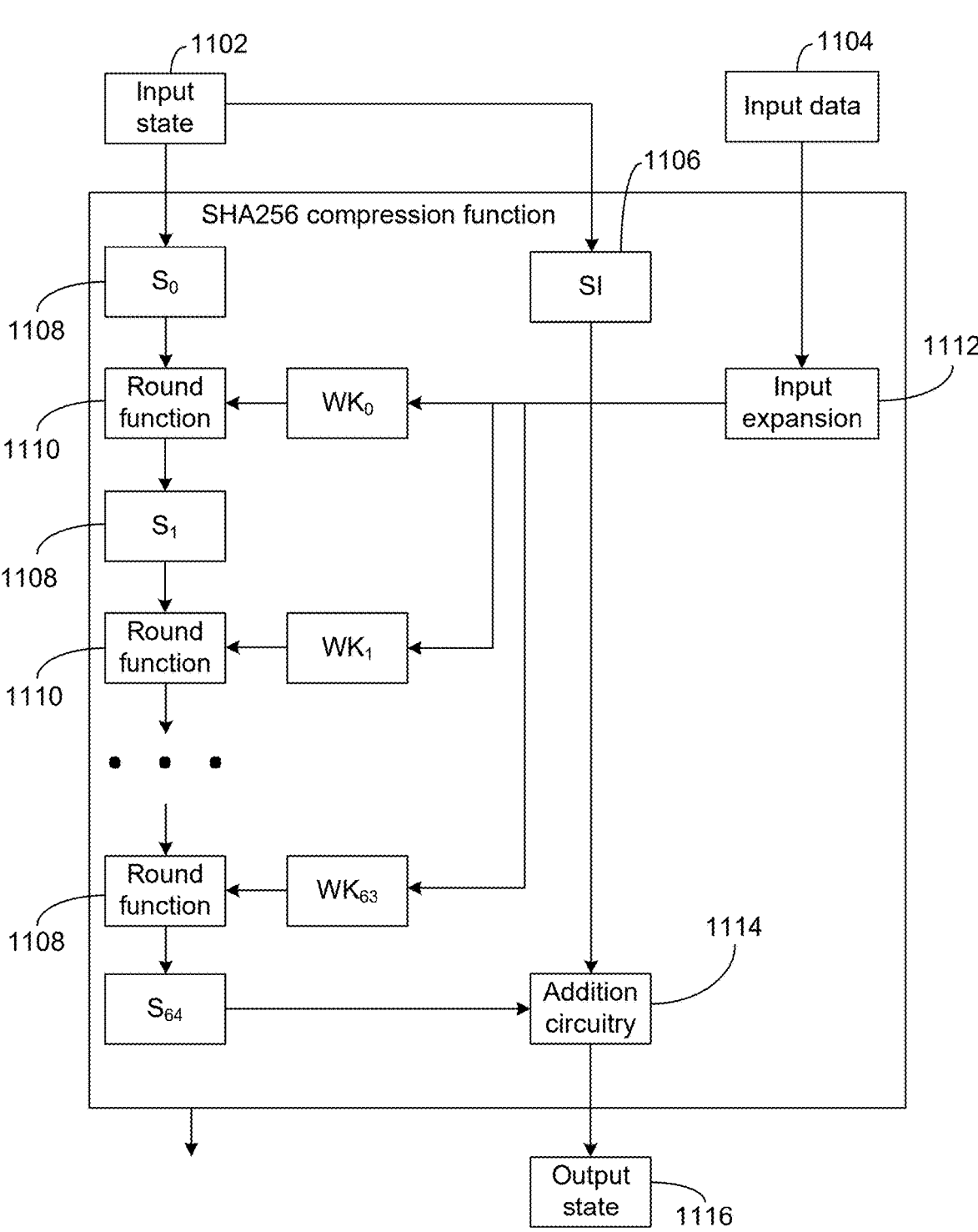
FIG. 11 is a schematic representation of a method executed by circuitry according to some embodiments of the invention.

An exemplary circuitry (FIG. 11) for SHA256 compression function comprises:

Input lines representing the initial SHA256 state, one of the inputs (1102);

Input lines representing the 16 32-bit input words, another input to the SHA256 compression function (1104);

Register SI( )representing a copy of the initial SHA256 state (1106);

Register S representing the SHA256 internal state between the loop iterations (1108), shown several times to depict different values stored in the register at different loop iterations;

A round function circuitry (1110), shown several times to depict using said circuitry at different loop iterations;

A SHA256 data expansion unit (1112)

A circuitry which performs addition of representations of 32-bit words modulo $2^{32}$ (1114);

Output lines (1116)

An exemplary order of calculation using this circuitry is as follows:

Copy the initial internal state from the input lines 1102 to the registers SI (1106) and S (1108);

Supply the input data 1104 to the data expansion unit 1112;

64 times perform a loop iteration, each iteration comprising:

Receiving the current state of the register S (1108) and a word WK from the data expansion unit 1112;

Using the round function circuitry 1110, update the state of the register S (1108);

Using the addition circuitry 1114, perform addition modulo $2^{32}$ of the 8 words of the register S with the corresponding words of the register SI;

Output the resulting 8 words to the output lines 1116.

In order for the circuitry described above to be efficient against side-channel attacks, it should typically be implemented using realizations of bits and gadgets in shares, as explained below.

Exemplary Realizations of a Bit

For purposes of this specification and the accompanying claims, a tuple $B = \langle b_0, b_1, \ldots, b_{n-1}\rangle$, where $b_i \in F$, $i = 0, 1, \ldots, n-1$ is called a realization in n shares of a bit $$b = \sum_{i=0}^{n-1} b_i \in F.$$

Here b is called "the value of B" and denoted as b=Val (B).

Note that in order to distinguish similar but significantly different objects-vectors and realizations with shares, different notations are used-superscripts and numbering from one for vectors but subscripts and numbering from zero for realizations.

G denotes the space $F^n$ of the realization and is represented as union of two disjoint sets $G = R_0 \cup R_1$, where $$R_b = \{B \in G : Val(B) = b\}(b \in F).$$

The factor space with respect to this splitting is denoted by H=G/F.

The function Val can also be applied to to a vector $U \in G^k$ by applying it to each coordinate separately. In the same sense splitting $$G^k = U_{u \in F^k} R_u$$

can be considered, where $$R_u = \{U \in G^k : Val(U) = u\}.$$

For purposes of this specification and the accompanying claims, each set $R_u$ as determined above is called a realizations class of u.

Since $R_{u_1} \cap R_{u_2} = \emptyset$ if $u_1 \neq u_2$, a set of realizations classes constitutes a splitting of the space into equivalence classes.

Exemplary Realizations of Gadgets and Circuits

For purposes of this specification and the accompanying claims,

A gadget M: $G^k \to G^l$ is called realization in n shares of gadget m: $F^k \to F^l$ if for each $U \in G^k$ holds $$Val(M(U)) = m(Val(U)).$$

Each realization M of gadget m determines for each $u \in F^k$ a splitting of the set $R_u$ into equivalence classes. Two elements $U_1$, $U_2 \in G^k$ fall into one class if $M(U_1) = M(U_2)$.

For purposes of this specification and the accompanying claims, a realization is called (locally) uniform at $u \in F^k$ if all equivalence classes of $R_u$ have the same cardinality. For purposes of this specification and the accompanying claims, a realization is called (globally) uniform if it is locally uniform at all $u \in F^k$.

For purposes of this specification and the accompanying claims, a realization is "non-complete" if each share of each output variable does not depend on at least one share of all input variables.

In the language of probability theory local uniformity at u means that if the set of shares of u are independent random bits then the set of shares of m (u) are also independent random bits.

The following exemplary realizations assume n=3.

Exemplary Randomization

Randomization is a universal method to reach uniformity of a variable. Randomization means adding (XORing) a representation of zero.

Parameters: a, zero, where zero=<zero⁰, zero¹, zero²=zero⁰+zero¹> is a realization of bit 0.

Function Randomize (a, zero).

$$\text{Randomize}_0 = a_0 + \text{zero}^0$$

$$\text{Randomize}_1 = a_1 + \text{zero}^1$$

$$\text{Randomize}_2 = a_2 + \text{zero}^0 + \text{zero}^1$$

Exemplary Realizations of Linear Functions

A realization of a linear function is obtained by applying said linear function to each its share separately. In particular this is true for the functions XOR2, $\Sigma_0$, $\Sigma_1$. However sometimes this realization does not satisfy uniformity condition, so other realizations are used. In particular an alternative realization of function XOR3 is presented below.

Exemplary gadgets realizations: MAJ

Parameters: a, b, c.

Function Maj (a, b, c).

$$\text{Maj}_0 = a_1 b_2 + a_1 c_2 + b_1 a_2 + b_1 c_2 + c_1 a_2 + c_1 b_2 + a_2 b_2 + a_1 c_1 + b_1 c_1$$

$$\text{Maj}_1 = a_2 b_0 + a_2 c_0 + b_2 c_0 + b_2 c_0 + c_2 a_0 + c_2 b_0 + a_0 b_0 + a_2 c_2 + b_2 c_2$$

$$\text{Maj}_2 = a_0 b_1 + a_0 c_1 + b_0 a_1 + b_0 c_1 + c_0 a_1 + c_0 b_1 + a_1 b_1 + a_0 c_0 + b_0 c_0$$

Exemplary Gadgets Realizations: Ch

Parameters: a, b, c.

Function Ch (a, b, c).

$$Ch_0 = a_1 b_1 + a_1 b_2 + a_2 c_1 + a_1 c_1 + a_1 c_2 + a_2 c_1 + c_1$$

$$Ch_1 = a_2 b_2 + a_2 b_0 + a_0 b_2 + a_2 c_2 + a_2 c_0 + a_0 c_2 + c_2$$

$$Ch_2 = a_0 b_0 + a_0 b_1 + a_1 b_0 + a_0 c_0 + a_0 c_1 + a_1 c_0 + c_0$$

Exemplary gadgets realizations: Lin

Parameters: a, b, c.

Function Lin (a, b, c).

$$Lin_0 = a_1 b_2 + a_1 c_2 + b_1 a_2 + b_1 c_2 + c_1 a_2 + c_1 b_2 + a_2 b_2 + a_1 c_1 + b_1 c_1$$

$$Lin_1 = a_2 b_0 + a_2 c_0 + b_2 a_0 + b_2 c_0 + c_2 c_0 + c_2 b_0 + a_0 b_0 + a_2 c_2 + b_2 c_2$$

$$Lin_2 = a_0 b_1 + a_0 c_1 + b_0 a_1 + b_0 c_1 + c_0 a_1 + c_0 b_1 + a_1 b_1 + a_0 c_0 + b_0 c_0$$

Exemplary gadgets realizations: AND2. Instead of the function AND2 of two arguments a, b, a realization of the function AND2* of three arguments a, b, r is used, where r is a one-bit variable. Functions AND2 (a, b) and AND2+ (a, b, r) are functionally equivalent for any value of r, i.e. Val (AND2 (a,b))=Val (AND2+ (a, b, r)); the last argument r is used only for randomization.

Parameters: a, b, r.

Function AND2+ (a, b, r).

$$AND2_0* = a_1 b_1 + a_1 b_2 + a_2 c_1 + a_2 r + b_2 r$$

$$AND2_1* = a_2 b_2 + a_2 b_0 + a_0 b_2 + a_2 r + b_2 r + r$$

$$AND2_0* = a_0 b_0 + a_0 b_1 + a_1 b_0 + r$$

Exemplary Gadgets Realizations: Alternative Realization of the Function XOR3.

Parameters: a, b, c.

Function XOR3 (a,b,c).

$$XOR3_0 = a_2 + b_1 + c_1$$

$$XOR3_1 = a_0 + b_2 + c_2$$

$$XOR3_2 = a_1 + b_0 + c_0$$

Exemplary gadgets realizations: Maj+XOR3.

Parameters: a, b, c.

Function Maj (a,b,c), XOR3 (a,b,c).

$$\text{Maj}_0 = a_1 b_2 + a_1 c_2 + b_1 a_2 + b_1 c_2 + c_1 a_2 + c_1 b_2 + a_2 b_2 + a_1 c_1 + b_1 c_1$$

$$\text{Maj}_1 = a_2 b_0 + a_2 c_0 + b_2 c_0 + b_2 c_0 + c_2 c_0 + c_2 b_0 + a_0 b_0 + a_2 c_2 + b_2 c_2$$

$$\text{Maj}_2 = a_0 b_1 + a_0 c_1 + b_0 a_1 + b_0 c_1 + c_0 a_1 + c_0 b_1 + a_1 b_1 + a_0 c_0 + b_0 c_0$$

$$XOR3_0 = a_2 + b_1 + c_1$$

$$XOR3_1 = a_0 + b_2 + c_2$$

$$XOR3_2 = a_1 + b_0 + c_0$$

Exemplary gadgets realizations: AND2*+XOR2.

Parameters: a, b, random parameter r.

Function AND2*(a, b, r), XOR2 (a, b).

$$AND2_0* = a_1 b_1 + a_1 b_2 + a_2 b_1 + a_2 r + b_2 r$$

$$AND2_1* = a_2 b_2 + a_2 b_0 + a_0 b_2 + a_2 r + b_2 r + r$$

$$AND2_2* = a_0 b_0 + a_0 b_1 + a_1 b_0 + r$$

$$XOR2_0 = a_0 + b_0$$

$$XOR2_1 = a_1 + b^1$$

$$XOR2_2 = a_2 + b_2$$

Exemplary Gadgets Realizations: Compose (AND2*+Lin).

Parameters: $p^1$, $p^2$, $g^1$, $g^2$.

Function AND2*($p^1$, $p^2$, $g_0^1$), Lin ($g^1$, $p^2$, $g^2$).

$$AND2_0* = p_1^1 p_1^2 + p_1^1 p_2^2 + p_2^1 p_1^2 + p_2^1 g_0^1 + p_2^2 g_0^1$$

$$AND2_1* = p_2^1 p_2^2 + p_2^1 p_0^2 + p_0^1 p_2^2 + p_2^1 g_0^1 + p_2^2 g_0^1 + g_0^1$$

$$AND2_2* = p_0^1 p_0^2 + p_0^1 p_1^2 + p_1^1 p_0^2 + g_0^1$$

$$Lin_0 = g_1{}^1p_1{}^2 + g_1{}^1p_2{}^2 + g_2{}^1p_1{}^2 + g_1{}^2$$

$$Lin_1 = g_2{}^1p_2{}^2 + g_2{}^1p_0{}^2 + g_0{}^1p_2{}^2 + g_2{}^2$$

$$Lin_2 = g_0{}^1p_0{}^2 + g_0{}^1p_1{}^2 + g_1{}^1p_0{}^2 + g_0{}^2$$

Note that it this realization of the gadget Compose, unlike in the realization of AND2*by itself, an additional random input r is not required, and $g_0{}^1$ is used as the third argument of AND2*instead.

Exemplary Protected SHA256 Compression Function Circuitry

Exemplary protected SHA256 compression function circuitry can be produced from the described above SHA256 compression function circuitry by replacing every bit in registers with three bits of its realization, and every gadget with its realization as described above. In FIG. 8A the additional random input r (810) is used for the function MultiANDshifted (812). In FIG. 9 the blocks marked "R" implement function Randomize. Random inputs to the blocks that require them (marked "R" and "KS") are not shown.

Exemplary Method of Critical Path Reduction

In some exemplary embodiments of the invention there is provided a method of reducing a number of sequential operations (critical path) during calculating an arithmetical sum of n addends on a data processor. In some embodiments reducing the critical path contributes to an increase in efficiency of operation of the data processor.

The method includes:

(a) iteratively transforming a sum of 3 addends to a sum of 2 addends until only 2 addends remain, so that the number of sequential operations involved in every such transformation of a sum of 3 addends to a sum of 2 addends does not depend on the size of addends in bits; and (b) using a parallel prefix form carry look-ahead adder to calculate a sum of said 2 addends.

In some embodiments a number of sequential operations in said calculating is proportional to a size of said 2 addends in bits.

Alternatively or additionally, in some embodiments each addend is represented as an exclusive or (XOR) of k shares.

According to various exemplary embodiments of the invention the parallel prefix form carry look-ahead adder is selected from the group consisting of Kogge-Stone adder (KSA or KS), Brent-Kung adder (BKA), Han-Carlson adder (HCA), and Lynch-Swartzlander spanning tree adder (STA).

Alternatively or additionally, in some embodiments the transforming from a sum of 3 addends to 2 addends is performed as at least one set of parallel transformations.

Alternatively or additionally, in some embodiments the method guarantees equal probabilities of representations of the result in said shares provided the probabilities of representation of addends in said shares are equal during said transforming from a sum of 3 addends to 2 addends.

In some embodiments the above method is employed in calculation of a hash function. According to various exemplary embodiments of the invention the hash function includes a member of the group consisting of SHA-1, SHA-2 and SM-3.

Exemplary IP Core for Critical Path Reduction

In some exemplary embodiments of the invention there is provided a semiconductor intellectual property (IP) core including circuitry which reduces a number of sequential operations (critical path) during calculating an arithmetical sum of n addends. In some embodiments reducing the critical path contributes to an increase in efficiency of operation of the data processor.

The method includes:

(a) a transformation module configured to iteratively transform a sum of 3 addends to a sum of 2 addends until only 2 addends remain, so that the number of sequential operations involved in every such transformation of a sum of 3 addends to a sum of 2 addends does not depend on the size of addends in bits; and (b) an adder which employs a parallel prefix form carry look-ahead algorithm to calculate a sum of said 2 addends.

In some embodiments a number of sequential operations in said calculating is proportional to a size of said 2 addends in bits.

Alternatively or additionally, in some embodiments each addend is represented as an exclusive or (XOR) of k shares.

Alternatively or additionally, in some embodiments the algorithm is selected from the group consisting of Kogge-Stone adder (KSA or KS), Brent-Kung adder (BKA), Han-Carlson adder (HCA), and Lynch-Swartzlander spanning tree adder (STA).

Alternatively or additionally, in some embodiments said transforming from a sum of 3 addends to 2 addends is performed as at least one set of parallel transformations.

Alternatively or additionally, in some embodiments the IP core guarantees equal probabilities of representations of the result in said shares provided the probabilities of representation of addends in said shares are equal during said transforming from a sum of 3 addends to 2 addends.

In some exemplary embodiments of the invention, an IP core including circuitry as described above is designed and configured to calculate a hash function. According to various exemplary embodiments of the invention the hash function includes a member of the group consisting of SHA-1, SHA-2 and SM-3.

Exemplary Problem of Modular Multiplication

Many machine implemented cryptographic algorithms, e.g. RSA, DH, DSA, ECDSA, require modular multiplication of long (typically between 256 and 4,096 bits long) integers, i.e. finding a number S such that $0 \leq S < M$ and $S \equiv AB$ modulo M for an arbitrary positive modulus M and arbitrary integers A, B such that $0 \leq A < M$, $0 \leq B < M$.

One of the attacks on these algorithms is a timing attack, i.e. finding the private key by measuring the time that the calculation takes for different input values. In order to exclude the possibility of timing attacks, it is essential to ensure that the timing does not depend on the input values—except that it may depend on the modulus size which is constant and not secret for any private key.

Exemplary Solutions to the Problem

The suggested solution is presented in several steps, starting from simple (not modular) multiplication and adding one improvement at every step. Capital letters, e.g. X, are used for long integers, and the corresponding small letter with an index, e.g. $x_i$, for the $i^{th}$ bit of X, where the bits are numbered from the least significant (LSB) to the most significant (MSB), starting from index 0, so that the following equation holds:

$$X = \sum_{i=0}^{n-1} 2^i x_i,$$

where n is the number of bits by which X is represented.

Algorithm1: School Long Multiplication

For regular multiplication, algorithm 1 taught in schools can be used:

Inputs: Two non-negative integers A, B of bit sizes m, n respectively.

Output: Product AB of bit size m+n.

$S=0$ for $i=0 \ldots n-1$ $S=S+2^i b_i A$ return S

Algorithm 2: Reverse Long Multiplication

In Algorithm 1 the multiplicand B is scanned from the least significant bit to the most significant bit. In order to transform regular multiplication to modular multiplication, the order of the scanning of B is reversed.

Algorithm 2. Reverse Long Multiplication

Inputs: Two non-negative integers A, B of bit sizes m, n respectively.

Output: Product AB of bit size m+n.

$S=0$ for $i=n-1 \ldots 0$ $S=2S$ $S=S+b_i A$ return S

Algorithm 3. Basic Modular Multiplication

The most straightforward way to perform modular multiplication AB mod M is to first multiply A by B using one of the algorithms above (algorithm 1 or algorithm 2), and then divide the product AB by M (in other words, perform modular reduction). The disadvantage of this method is that the intermediate result AB is in the worst case twice longer than the modulus M, which increases the hardware burden. Therefore a different basic algorithm of modular multiplication with modular reduction steps interleaved with multiplication steps is presented, so that the intermediate results are longer than the modulus by no more than 2 bits. For constant timing the multiplicands are represented with the same number of bits as the modulus, adding, if needed, leading zeros.

Algorithm 3. Basic Modular Multiplication

Inputs: Positive modulus M of bit size n and two non-negative integers A, B such that $0 \leq A < M$, $0 \leq B < M$.

Output: Modular product AB mod M of bit size n.

$S=0$ for $i=n-1 \ldots 0$ $S=2S$ $S=S+b_i A$ $q=\lfloor S/M \rfloor$ $S=S-qM$ return S Modular Multiplication with Partial Reduction The disadvantage of Algorithm 3 is that it is difficult to guarantee constant timing of a single iteration. (The number of iterations n is the bit size of the modulus, which is acceptable.) The problematic part of the algorithm is the calculation $q=\lfloor S/M \rfloor$ which is routinely performed by trial division, i.e., by guessing the result and its subsequent adjustment in the case where the guess was incorrect. Such trial division is either performed in a non-constant time (depending on the correctness of the initial guess), or is inefficient (if the adjustment is performed always, but its result is thrown away in the case the adjustment is not actually needed).

In order to improve this algorithm, the problem to be solved is changed. Instead of standard modular multiplication (i.e., finding a number S such that $0 \leq S < M$ and $S \equiv AB$ modulo M) the requirement $0 \leq S < M$ is replaced with a weaker requirement $0 \leq S < M+2^{n-\Delta}$. The value of A in this formula will be discussed later. Since in many algorithms modular multiplications are chained (i.e. the output of one modular multiplication serves as an input to another modular multiplication) it is desirable to weaken the condition on the multiplicands as well, i.e. $0 \leq A < M+2^{n-\Delta}$, $0 \leq B < M+2^{n-\Delta}$, so that multiplication can be chained without full modular reduction in between. Only the final result of a chain of multiplications needs to undergo full modular reduction (to a remainder less than M). The following algorithm achieves these goals.

Algorithm 4. Modular Multiplication with Partial Reduction

Inputs: Positive modulus M of bit size n and two non-negative integers A, B such that $0 \leq A < M+2^{n-\Delta}$, $0 \leq B < M+2^{n-\Delta}$.

Output: Non-negative integer S of bit size n such that $0 \leq S < M+2^{n-\Delta}$ and $S \equiv AB$ modulo M.

$S=0$ for $i=n-1 \ldots 0$ $S=2S$ $S=S+b_i A$ if $\lfloor 2^{\Delta-n}S \rfloor > \lfloor 2^{\Delta+1-n}M \rfloor$ $q_0=2$ else $q_0=0$ $S=S-q_0 M$ if $\lfloor 2^{\Delta-n}S \rfloor > \lfloor 2^{\Delta-n}M \rfloor$ $q_1=1$ else $q_1=0$ $S=S-q_1 M$ return S This algorithm includes two modular reductions, with $q_0=2$ and $q_1=1$, which essentially are conditional. However, in order to ensure fixed timing, both modular reductions are performed unconditionally, while if a reduction is in fact unnecessary, its coefficient is changed to 0.

The decision on whether to change the coefficient to 0 is based on comparing only several most significant bits of the intermediate result S with the most significant bits of M (or 2M). If these bits are equal, it is impossible to decide based only of the values of these bits which of the two values is greater. In this case the coefficient is changed to 0 (i.e., effectively no modular reduction is performed), so that in no case the result is negative, but on the other hand it may remain greater than M (or 2M).

Modular Multiplication with Partial Reduction and a Short Critical Path

The last enhancement of the modular multiplication algorithm deals with the shortening of the critical path in a hardware implementation. For efficiency it is desirable that every loop iteration be performed in one clock cycle. The addition and two subtractions of long numbers which are performed at every iteration increase the burden on hardware. In a naïve implementation they have a long critical path due to the carry propagation which may have a drastic impact on the maximal frequency. Alternatively it is possible to use one of the carry look ahead algorithms, e.g. Kogge-Stone, Brent-Kung, Han-Carlson, or Lynch-Swartzlander. With any of these algorithms the critical path is much shorter, however the gate count grows significantly. In order to avoid these disadvantages, the representation of the intermediate result S as a modular sum of two components $S = S^0 + S^1 \bmod 2^{n+\delta}$ is suggested, where the value of $\delta$ will be discussed later. Additions to and subtractions from S are replaced with functions that transform $S^0 + S^1 + X$ and $S^0 + S^1 - X$ to the form of $S'^0 + S'^1$. At the last step, the algorithm performs full addition $S^0 + S^1 \bmod 2^{n+\delta}$ only once in order to produce the final result, using either the naïve algorithm or one of the carry look ahead algorithms.

In the following two auxiliary algorithms "$\oplus$" stands for logical XOR, multiplication stands for logical AND, and "$\tilde{x}$" stands for negation.

Algorithm 5 "Add". Transformation of A+B+C to D+E Modulo $2^{n+\delta}$

Inputs: Three non-negative integers A, B, C of bit size n+$\delta$ that represent $X = A + B + C \bmod 2^{n+\delta}$ Outputs: Two non-negative integers D, E of bit size n+$\delta$ that represent the same $$X = D + E \bmod 2^{n+\delta}$$

for $i = 0 \ldots n + \delta - 1$ $$d_i = a_i \oplus b_i \oplus c_i$$

$$e_0 = 0$$

for $i = 0 \ldots n + \delta - 2$ $$e_{i+1} = a_i b_i \oplus b_i c_i \oplus c_i a_i$$

return D, E

Algorithm 6 "Sub". Transformation of A+B−C to D+E modulo $2^{n+\delta}$

Inputs: Three non-negative integers A, B, C of bit size n+$\delta$ that represent $X = A + B - C \bmod 2^{n+\delta}$ Outputs: Two non-negative integers D, E of bit size n+$\delta$ that represent the same $$X = D + E \bmod 2^{n+\delta}$$

for $i = 0 \ldots n + \delta - 1$ $$d_i = a_i \oplus b_i \oplus \tilde{c}_i$$

$$e_0 = 1$$

for $i = 0 \ldots n + \delta - 2$ $$e_{i+1} = a_i b_i \oplus b_i \tilde{c}_i \oplus c_i a_i$$

return D, E

Algorithm 7. Modular Multiplication with Partial Reduction and a Short Critical Path Inputs: Positive modulus M of bit size n and two non-negative integers A, B such that $0 \leq A < M + 2^{n-\Delta}, 0 \leq B < M + 2^{n-\Delta}$.

Output: Non-negative integer S of bit size n such that $0 \leq S < M + 2^{n-\Delta}$ and $S \equiv AB$ modulo M.

$$S^0, S^1 = 0, 0$$

for $i = n - 1 \ldots 0$ $$S^0, S^1 = 2S^0, 2S^1$$

$$S^0, S^1 = Add(S^0, S^1, b_i A)$$

if$(\lfloor 2^{\Delta-n} S^0 \rfloor + \lfloor 2^{\Delta-n} S^1 \rfloor + 1) \bmod 2^{\Delta+\delta} > (\lfloor 2^{\Delta+1-n} M \rfloor + 1) \bmod 2^{\Delta+\delta}$ $$q_0 = 2$$

else $$q_0 = 0$$

$$S^0, S^1 = Sub(S^0, S^1, q_0 M)$$

if$(\lfloor 2^{\Delta-n} S^0 \rfloor + \lfloor 2^{\Delta-n} S^1 \rfloor + 1) \bmod 2^{\Delta+\delta} > (\lfloor 2^{\Delta-n} M \rfloor + 1) \bmod 2^{\Delta+\delta}$ $$q_1 = 1$$

else $$q_1 = 0$$

$$S^0, S^1 = Sub(S^0, S^1, q_1 M)$$

$$S = (S^0 + S^1) \bmod 2^{n+\delta}$$

return S

The values of the Parameters

In the above, two parameters $\Delta$ and $\delta$ are used. It is possible to prove that for the algorithm to work correctly it is necessary that $\Delta \geq 3$, $\delta \geq 2$. The recommended values are $\Delta = 3$, $\delta = 2$.

Exemplary IP Core for Modular Multiplication

In some exemplary embodiments of the invention there is provided a semiconductor intellectual property core (IP) including circuitry that receives as inputs a positive integer modulus M at least 256 bits long and two non-negative integers A and B and calculates a non-negative integer R such that R mod M=AB mod M where the calculation time depends only on the size of the modulus in bits.

In some embodiments said calculating a non-negative integer R uses the following algorithm:

set $R = 0$ for every bit $b_i$ of B, from the most significant bit to the least significant bit, perform the following:

set $R = 2 \cdot R$ set $R = R + b_i A$ one or more operations of the kind $R = R - q \cdot 2^n M$, where for every such operation n is a fixed non-negative integer and q is set to 0 or 1 each time return R wherein all the integers involved in the said calculations are padded if needed by leading zeros to the bit size s+d, wherein s is the modulus size in bits and d is a positive integer constant.

In some embodiments said q is set to 1 if the integer formed by k most significant bits of R are greater than the integer formed by k most significant bits of $2^n M$, and to 0 otherwise, where k is a positive integer constant. Alternatively or additionally, in some embodiments there are exactly two operations of the kind R=R−q·2"M, wherein for the first said operation n=1 and for the second said operation n=0. Alternatively or additionally, in some embodiments d=2, and/or k=5.

Alternatively or additionally, in some embodiments the input numbers A,B must be less than αM and the output R is guaranteed to be less than αM, wherein α is a constant greater than 1. In some embodiments α=1.25.

In some embodiments, R is represented by a pair of integers $R_1$, $R_2$, wherein $R=R_1+R_2$ mod $2^{s+d}$.

Alternatively or additionally, in some embodiments said additions to and subtractions from R convert the sum of three addends $R_1$, $R_2$, X to a sum of two addends $R_1'$, $R_2'$ so that $R_1'+R_2'$ mod $2^{s+d}=R_1+R_2+X$ mod $2^{s+d}$.

Exemplary Method for Modular Multiplication

In some exemplary embodiments of the invention there is provided a method comprising:

receiving at a data processor as inputs:

a positive integer modulus M at least 256 bits long; and two non-negative integers A and B; and calculating, by means of said data processor a non-negative integer R;

such that R mod M=AB mod M where the calculation time required by the data processor depends only on the size of the modulus in bits.

In some exemplary embodiments of the invention, said calculating a non-negative integer R uses the following algorithm:

set $R=0$ for every bit $b_i$ of B, from the most significant bit to the least significant bit, perform the following:

set $R=2·R$ set $R=R+b_iA$ one or more operations of the kind R=R−q·2"M, where for every such operation n is a fixed non-negative integer and q is set to 0 or 1 each time return R wherein all the integers involved in the said calculations are padded if needed by leading zeros to the bit size s+d, wherein s is the modulus size in bits and d is a positive integer constant.

In some exemplary embodiments of the invention, said q is set to 1 if the integer formed by k most significant bits of R are greater than the integer formed by k most significant bits of 2"M, and to 0 otherwise, where k is a positive integer constant.

Alternatively or additionally, in some embodiments there are exactly two operations of the kind R=R−q·2"M, wherein for the first said operation n=1 and for the second said operation n=0.

In some exemplary embodiments of the invention, d=2 and/or k=5.

Alternatively or additionally, in some embodiments the input numbers A,B must be less than αM and the output R is guaranteed to be less than αM, wherein α is a constant greater than 1. In some embodiments α=1.25.

Alternatively or additionally, in some embodiments R is represented by a pair of integers $R_1$, $R_2$, wherein $R=R_1+R_2$ mod $2^{s+d}$.

Alternatively or additionally, in some embodiments said additions to and subtractions from R convert the sum of three addends $R_1$, $R_2$, X to a sum of two addends $R_1'$, $R_2'$ so that $R_1'+R_2'$ mod $2^{s+d}=R_1+R_2+X$ mod $2^{s+d}$.

Exemplary Advantages

In some embodiments, implementation of method 200 and/or 300 and/or 400 in hardware (and no other implementation of HMAC and/or block ciphers is feasible) increases resistance to template attacks by preventing the learning stage. In some embodiments, preventing the learning stage contributes to prevention of application of hash function(s) to arbitrary data inputs. Depicted exemplary IP core 100 implements methods of type 200 and/or 300 and shares these advantages. Depicted exemplary IP core 500 implements methods of type 400 and shares these advantages.

Alternatively or additionally, in some embodiments implementation of defense of GCM Authentication (GHASH) Against Side-Channel Attacks contributes to an increase in hardware security.

Alternatively or additionally, in some embodiments shortening the critical path in a hardware implementation of raising to the power of 254 in $GF(2^8)$ improves performance of a data processor.

Alternatively or additionally, in some embodiments, limiting the degree of polynomials over a finite field GF(p) during multiplication operations to a degree less than n+d contributes to a reduction in data processor failure.

Alternatively or additionally, in some embodiments simulation of fault injection during the design stage of chip production as in method 600 contributes to an in increase in hardware security and/or a reduction in the development time for new chips.

Alternatively or additionally, in some embodiments method 700 increases hardware security by detecting and thwarting fault injection attacks (e.g. DFA attacks).

Alternatively or additionally, in some embodiments (1) dividing an intermediate result into subsets $M_i$, applying an error detection code to each of these subsets, rearranging into different subsets $N_j$ and applying an invertible transformation L before storing the intermediate results, and (2) applying $L^{-1}$ to every subset $N_j$ when reading from a register, rearranging into subsets $M_i$, verification of the EDC bits and raising an error flag if any of them is incorrect, stripping the EDC bits instead of only reading from a register, assures a low probability that a fault injected into the register will remain undetected and thus contributes to the robustness against some types of fault injection attacks, in particular Differential Fault Attacks.

Alternatively or additionally, in some embodiments use of modular multiplication contributes to a shortening of the critical path in a hardware implementation. In some exemplary embodiments of the invention, which rely on modular multiplication, multiplications are chained without full modular reduction in between.

It is expected that during the life of this patent many new hash functions and/or new block ciphers will be developed and the scope of the invention is intended to include all such new technologies a priori.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

Specifically, a variety of numerical indicators have been utilized. It should be understood that these numerical indicators could vary even further based upon a variety of engineering principles, materials, intended use and designs incorporated into the various embodiments of the invention. Additionally, components and/or actions ascribed to exemplary embodiments of the invention and depicted as a single unit may be divided into subunits. Conversely, components and/or actions ascribed to exemplary embodiments of the invention and depicted as sub-units/individual actions may be combined into a single unit/action with the described/depicted function.

Alternatively, or additionally, features used to describe a method can be used to characterize an apparatus or semiconductor intellectual property core and features used to describe an apparatus or semiconductor intellectual property core can be used to characterize a method.

It should be further understood that the individual features described hereinabove can be combined in all possible combinations and sub-combinations to produce additional embodiments of the invention. The examples given above are exemplary in nature and are not intended to limit the scope of the invention which is defined solely by the following claims.

Each recitation of an embodiment of the invention that includes a specific feature, part, component, module or process is an explicit statement that additional embodiments of the invention not including the recited feature, part, component, module or process exist.

Alternatively or additionally, various exemplary embodiments of the invention exclude any specific feature, part, component, module, process or element which is not specifically disclosed herein.

Specifically, the invention has been described in the context of HMAC and SHA-2 but might also be used the context of other hash functions and/or block ciphers.

All publications, references, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

The terms "include", and "have" and their conjugates as used herein mean "including but not necessarily limited to".

The invention claimed is:

1. An AES GCM semiconductor intellectual property (IP) core comprising:

circuitry for calculating a GHASH function, the calculating including:

assigning $X_0$ as a 128-bit sequence $0^{128}$;

computing the GHASH function, the computing including iteratively calculating:

$$X_{i+1} = H^k X_i + \sum_{j=0}^{k-1} \sum_{n=0}^{m-1} C_{ki+j} h_{ijn}$$

wherein for any i and any j:

$$\sum_{n=0}^{m-1} h_{ijn} = H^q$$

wherein q is a function of j, and wherein i, k and m are respective natural numbers, H is a 128-bit value, C is a bit string of a size that is divisible by 128, values of $h_{ijn}$ are respective 128-bit values, k>1, and m>1; and circuitry for generating an AES GCM block protected against side-channel attacks in which an attacker discovers a key.

2. The IP core according to claim 1, wherein addition, multiplication and raising to a power are in a finite field F of a characteristic p, p being a natural number.

3. The IP core according to claim 2, wherein p=2.

4. The IP core according to claim 3, wherein F=GF($2^{128}$), GF being a Galois field.

5. The IP core according claim 2, wherein elements of F are represented as respective polynomials over GF(p) modulo a polynomial P that is irreducible in GF(p), GF being a Galois field.

6. The IP core according to claim 5, wherein F=GF($2^{128}$).

7. The IP core according to claim 6, wherein P=$x^{128}+x^7+x^2+x+1$.

8. The IP core according to claim 1, wherein the respective 128-bit values of $h_{ijn}$ are randomly and independently generated for every value of i.

9. The IP core according to claim 1, wherein the addends of the sum $$\sum_{j=0}^{k-1} \sum_{n=0}^{m-1} C_{ki+j} h_{ijn}$$

are calculated in parallel.

10. The IP core according to claim 1, wherein the addends of the sum $$\sum_{j=0}^{k-1} \sum_{n=0}^{m-1} C_{ki+j} h_{ijn}$$

are calculated using a pipeline.

11. The IP core according to claim 1, wherein the addends of the sum $$\sum_{j=0}^{k-1} \sum_{n=0}^{m-1} C_{ki+j} h_{ijn}$$

are calculated using several pipelines in parallel.

12. A method comprising:

using a data processor to calculate a GHASH function, the calculating including:

assigning $X_0$ as a 128-bit sequence $0^{128}$;

computing the GHASH function, including iteratively calculating:

$$X_{i+1} = H^k X_i + \sum_{j=0}^{k-1} \sum_{n=0}^{m-1} C_{ki+j} h_{ijn}$$

wherein for any i and any j:

$$\sum_{n=0}^{m-1} h_{ijn} = H^q$$

wherein q is a function of j, and wherein i, k and m are respective natural numbers, His a 128-bit value, C is a bit string of a size that is divisible by 128, values of $h_{ijn}$ are respective 128-bit values, k>1 and m>1; and generating an AES GCM block protected against side-channel attacks in which an attacker discovers a key.

13. The method according to claim 12, wherein addition, multiplication and raising to a power are in a finite field F of a characteristic p, p being a natural number.

14. The method according to claim 13, wherein p=2.

15. The method according to claim 14, wherein F=GF $(2^{128})$, GF being a Galois field.

16. The method according to claim 13, wherein the elements of F are represented as polynomials over GF(p) modulo a polynomial P irreducible in GF(p), GF being a Galois field.

17. The method according to claim 16, wherein F=GF $(2^{128})$.

18. The method according to claim 17, wherein P=x$^{128}$+ x$^7$+x$^2$+x+1.

19. The method according to claim 12, wherein the respective 128-bit values of $h_{ijn}$ are randomly and independently generated for every value of i.

20. The method according to claim 12, wherein the addends of the sum $$\sum_{j=0}^{k-1} \sum_{n=0}^{m-1} C_{ki+j} h_{ijn}$$

are calculated in parallel.

21. The method according to claim 12, wherein the addends of the sum $$\sum_{j=0}^{k-1} \sum_{n=0}^{m-1} C_{ki+j} h_{ijn}$$

are calculated using a pipeline.

22. The method according to claim 12, wherein the addends of the sum $$\sum_{j=0}^{k-1} \sum_{n=0}^{m-1} C_{ki+j} h_{ijn}$$

are calculated using several pipelines parallel.

* * * * *